(12) United States Patent
Vaananen

(10) Patent No.: US 9,965,798 B1
(45) Date of Patent: May 8, 2018

(54) SELF-SHOPPING REFRIGERATOR

(71) Applicant: Mikko Vaananen, Helsinki (FI)

(72) Inventor: Mikko Vaananen, Helsinki (FI)

(73) Assignee: Mikko Vaananen, Helsinki (FI)

( * ) Notice: Subject to any disclaimer, the term of this patent is extended or adjusted under 35 U.S.C. 154(b) by 0 days. days.

(21) Appl. No.: 15/453,912

(22) Filed: Mar. 9, 2017

Related U.S. Application Data

(60) Provisional application No. 62/452,403, filed on Jan. 31, 2017.

(51) Int. Cl.

| | |
|---|---|
| *G06Q 30/00* | (2012.01) |
| *G06Q 30/06* | (2012.01) |
| *F25D 11/00* | (2006.01) |
| *F25D 23/12* | (2006.01) |
| *F25D 27/00* | (2006.01) |
| *F25D 25/04* | (2006.01) |
| *F25D 29/00* | (2006.01) |

(Continued)

(52) U.S. Cl.
CPC ......... *G06Q 30/0635* (2013.01); *F25D 11/00* (2013.01); *F25D 23/12* (2013.01); *F25D 25/04* (2013.01); *F25D 27/00* (2013.01); *F25D 29/00* (2013.01); *F25D 2500/06* (2013.01); *F25D 2700/06* (2013.01); *G06K 9/6267* (2013.01); *G06K 9/78* (2013.01); *G06K 2209/17* (2013.01)

(58) Field of Classification Search
CPC .......................................... G06Q 30/06–30/08
USPC ............................................. 705/26.1–27.2
See application file for complete search history.

(56) References Cited

U.S. PATENT DOCUMENTS 9,165,320 B1 * 10/2015 Belvin ............... G06Q 30/0633
2013/0027906 A1 * 1/2013 Ueda ....................... F25D 27/00
362/92

(Continued)

FOREIGN PATENT DOCUMENTS

WO 2011020742 A1 2/2011

OTHER PUBLICATIONS

Grimes, R., "Digital Appliance Age Dawns" (Nation's Restaurant News 34:4, Jan. 24, 2000) https://dialog.proquest.com/professional/docview/669785295?accountid=142257 (Year: 2000).*

(Continued)

*Primary Examiner* — Ethan D Civan
(74) *Attorney, Agent, or Firm* — Mikko Vaananen

(57) ABSTRACT

The invention provides a refrigerator system, a method and a software program product for controlling and/or advising a diet for a user. The refrigerator system has a refrigerator including a light and a camera that captures an image of contents of the refrigerator. The image is processed by a graphics processing unit (GPU) integrated with the refrigerator and/or a cloud server. The GPU analyzes the image to recognize a quantity, a quality, and/or a kind of food articles and/or food packages such as, vegetables, fruits, beverages, etc. A central processing unit (CPU)/GPU of the refrigerator provides diet plans, recipe recommendations, identifies grocery replenishment requirements, updates and shares shopping lists with food delivery agents, etc., based on the analysis of the refrigerator contents. The invention helps in minimizing food wastage, expanding meal options considering expiry dates, and maximizing benefits of a healthy diet by recommending and controlling the user's diet.

30 Claims, 17 Drawing Sheets

(51) Int. Cl.
*G06K 9/62* (2006.01)
*G06K 9/78* (2006.01)

(56) References Cited

U.S. PATENT DOCUMENTS

| | | | |
|---|---|---|---|
| 2013/0067375 A1* | 3/2013 | Kim | F25D 29/00 |
| | | | 715/769 |
| 2013/0325568 A1* | 12/2013 | Mangalvedkar | G06Q 30/0269 |
| | | | 705/14.4 |
| 2016/0123655 A1* | 5/2016 | Chow | F25D 23/04 |
| | | | 312/404 |
| 2016/0140146 A1* | 5/2016 | Wexler | G06F 17/30253 |
| | | | 707/741 |
| 2016/0171346 A1* | 6/2016 | Han | G06K 9/66 |
| | | | 382/103 |
| 2016/0327281 A1 | 11/2016 | Bhogal et al. | |
| 2017/0219276 A1* | 8/2017 | Wang | F25D 23/126 |

OTHER PUBLICATIONS

Moujahid, Adil, "A Practical Introduction to Deep Learning with Caffe and Python," published on Jun. 26, 2016, accessed at http://adilmoujahid.com/posts/2016/06/introduction-deep-learning-python-caffe/, pp. 20.

* cited by examiner

Social Networking Application 1

Italian pizza   # Delicious lunch

Social Networking Application 2

| Food Items | | |
|---|---|---|
| Name | Weight | Calorie |
| Egg | 100gm | 155 |
| Burger bun | 500gm | 210 |
| Pasta sauce | 1000gm | 470 |
| Pasta | 650gm | 221 |

Trainer Comments:
Instead of pasta and burgers have more of oats, salmon, avocado, carrots.

Application

| Ingredients | Quantity | Serving | Suggested Recipe |
|---|---|---|---|
| Bread base for Crust | 1 No. | | |
| Caramelized onion | 30gm | | |
| Slices of smoked salmon | 250gm | 3 - 4 | Smoked Salmon Pizza |
| Spaghetti Sauce | 60gm | | |
| Barbecue Sauce | 60gm | | |
| Cheese | 100gm | | |

Application

Shopping List

| Oats $4.50 | Add to Cart | |
| Salmon $10.00 | Add to Cart | |
| Avocado $8.50 | Add to Cart | |
| Carrots $6.00 | Add to Cart | |

Checkout 4 items $29.00

*FIG. 2B*

Food Items

| Name | Expiry date | Weight | Calorie |
|---|---|---|---|
| Egg | 24/Jan | 100gm | 155 |
| Milk | 25/Jan | 500gm | 210 |
| Orange | 27/Jan | 100gm | 470 |
| Broccoli | 30/Jan | 650gm | 221 |
| Chicken | 25/Jan | 2000gm | 4390 |
| Tomato | 30/Jan | 650gm | 221 |
| Ginger | 05/Feb | 100gm | 149 |

Shopping List

| | | Checkout 2 items $20.50 |
|---|---|---|
| Eggs $5.50 | | Add to Cart |
| Fish $15.00 | | Add to Cart |
| Broccoli $3.40 | | Add to Cart |

Recipe List

| Name | Ingredients | | Servings | Calories |
|---|---|---|---|---|
| | Name | Expiry | | |
| Chicken curry | Chicken Garlic Tomato | 25/Jan 05/Feb 30/Jan | 2 | 2000 |
| Broccoli curry | Broccoli Ginger Onion | 30/Jan 05/Feb 02/Feb | 2 | 300 |

*FIG. 3*

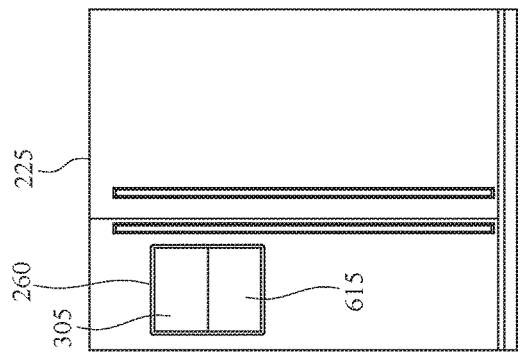
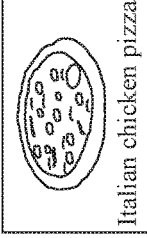
FIG. 8A
| Food Items | | | |
|---|---|---|---|
| Name | Expiry date | Weight | Calorie |
| Egg | 24/Jan | 100gm | 155 |
| Milk | 25/Jan | 500gm | 210 |
| Orange | 27/Jan | 1000gm | 470 |
| Broccoli | 30/Jan | 650gm | 221 |
| Chicken | 25/Jan | 2000gm | 4390 |
| Tomato | 30/Jan | 650gm | 221 |
| Ginger | 05/Feb | 100gm | 149 |
Italian chicken pizza
Changed recipe list for dinner
Beetroot salad with french fries
Egg salad with fish fillets
Broccoli roast with vegetable salad

SELF-SHOPPING REFRIGERATOR

TECHNICAL FIELD

Present disclosure generally relates to a refrigerator system, and more particularly to a refrigerator system that recommends and controls a diet of a human and/or a mammal.

BACKGROUND

A refrigerator is an indispensable household appliance that has been in use for more than a century for food storage. However, people end up wasting food and money in the process of preparing, consuming, and replenishing food stored in the refrigerator. For example, a person may not consume perishable food items in time to avoid the food from becoming stale. A person may forget about leftover meals kept in the refrigerator for later consumption, or may unknowingly purchase food items already present in the refrigerator. Food wastage not only burns a hole in consumer's pocket, but also contributes to environmental pollution, indirectly affecting people's health. Further, a person may misjudge the stale food to be consumable by simply looking or smelling the food and end up jeopardizing his/her health.

Presently, more than one-third of America's population is obese. This is primarily attributed to unhealthy eating habits and high calorie intake. People consume more of processed packaged food and drive-through picked up food items that are considered to be cheap, delicious and feasible to be stored in the refrigerator for multiple days. However, ignoring the high calorie intake associated with such food items leads to obesity and other health implications.

An oven including in-cavity sensors and a processor configured to automatically identify foodstuff within the cooking cavity based on the sensor measurements is disclosed in US 20160327281. This document is cited here as reference.

Further, in the prior art the consumers spend a considerable amount of time in the food procurement and logistics operation. In the prior art the consumer sends an electronic shopping list, which takes time to prepare, to a shop with home delivery. Alternatively, the consumer goes to the shop himself to do the purchases which takes even more time.

The prior art is deficient in techniques that can identify and suggest consumption of food items present in the refrigerator before they become stale. Further, the prior art is deficient in methods of assisting a user with timely procurement and replenishment of food items and consumption of healthier food choices.

SUMMARY

It is an object of the invention to address and improve aforementioned deficiencies in above discussed prior art(s).

It is an object of the invention to control and/or advice on a diet of a human and/or a mammal via a refrigerator system. The refrigerator system comprising a refrigerator having a central processing unit (CPU), a graphics processing unit (GPU), and a user terminal device is provided for recommending and implementing reduced food wastage, healthier diet, and variable diet options. Although the invention is described hereinafter with reference to the CPU performing some computer programs and/or instructions and the GPU performing some computer programs and/or instructions, it is to be understood that both the CPU and the GPU may be used interchangeably to perform these computer programs and/or instructions within the scope of the invention. For example, the GPU may perform a portion or all of computer programs and/or instructions described herein as performed by the CPU and vice versa.

In one aspect of the invention, the refrigerator is equipped with at least one light that remains on when a door of the refrigerator closes. The light allows an inside of the refrigerator to remain illuminated at all times or sometimes to facilitate capturing images of the refrigerator's food content. The light may be, for example, a halogen lamp, a fluorescent lamp, a metal halide lamp, a sulphur lamp, an electrodeless lamp, an LED, an incandescent bulb, a light bulb, etc. In an example, each shelf of the refrigerator has a light affixed to an internal wall of the shelf. In an embodiment, the internal wall is a transparent wall such that light emerges from the internal wall that may illuminate the inside of the refrigerator.

In another aspect of the invention, the refrigerator includes at least one camera for capturing images of food articles and/or food packages stored in the refrigerator. The image may be stored in a data file and/or other memory mediums such as, a local memory unit of the refrigerator, a removable data storage device, or in the cloud server. The camera may be, for example, a pinhole camera, a digital camera, a remote camera, a lipstick camera, cameras with CMOS sensors, cameras with CCD sensors, etc. In an example, each shelf of the refrigerator has a camera affixed to an internal wall of the shelf. The food articles and/or the food packages may comprise, for example, fruits, vegetables, meat and fish items, dairy products, eggs, bread items, canned beverages, packaged or canned fruit juices, spices, condiments, etc.

In a further aspect of the invention, the GPU analyses the images of the food articles and/or the food packages captured by the camera. In an embodiment, the GPU is integrated with a control unit of the refrigerator comprising the central processing unit (CPU) and a memory unit. In another embodiment, the GPU is integrated with a cloud server in communication with the refrigerator via a network. In this embodiment, the images captured by the refrigerator's camera are sent to the cloud server's GPU for processing.

In another aspect of the invention, the GPU analyses the images to recognize food quantity, quality, and/or kind from the images. The information derived from the analysis concerning the food quantity, the quality, and/or the kind can be used to control and/or advise a diet plan for the human and/or the mammal; identify deficiencies in food content of the refrigerator; update shopping lists with the deficient food articles and/or the food packages; identify a recipe using the food articles and/or the food packages; identify a best before date of food articles and/or the food packages and suggest recipe options using the food articles and/or the food package to avoid food wastage, etc.

A refrigerator system configured to control and/or advise on the diet of a human and/or a mammal is in accordance with the invention and characterised in that, at least one internal wall of the refrigerator is configured to have at least one light, at least one internal wall of the refrigerator is configured to have at least one camera, at least one food article and/or food package is configured to be stored inside the refrigerator, the at least one camera is configured to take an image of the food article and/or food package and store it into a data file or other memory medium, a graphical processing unit GPU is configured to analyse the at least one image, the GPU is configured to recognise the food quantity, quality and/or kind from the image.

A method for controlling and/or advising on the diet of a human and/or a mammal, comprising at least one refrigerator, at least one graphics processing unit, at least one camera, characterised by the following steps, at least one food article and/or food package is stored inside the refrigerator, at least one light inside the refrigerator illuminates at least one food article and/or food package, at least one camera inside the refrigerator photographs at least one food article and/or food package, the at least one camera takes an image of the food article and/or food package and stores it into a data file or other memory medium, a graphical processing unit GPU analyses the at least one image, the GPU recognises the food quantity, quality and/or kind from the image.

A software program product stored in a memory medium for controlling and/or advising on the diet of a human and/or a mammal, operable with at least one refrigerator, at least one graphics processing unit, at least one camera, characterised by the following steps, at least one food article and/or food package is stored inside the refrigerator, at least one light inside the refrigerator illuminates at least one food article and/or food package, at least one camera inside the refrigerator photographs at least one food article and/or food package, the camera takes an image of the food article and/or food package and the software program product stores it into a data file or other memory medium, the software program product uses the graphical processing unit GPU to analyse the at least one image, the software program product uses the GPU to recognise the food quantity, quality and/or kind from the image.

The invention has sizable advantages. The invention results in ensuring minimal or no food wastage, provides one or multiple diet plan options as a function of time, and provides healthier and nutritious diet choices. By identifying deficient food articles or packages to be replenished and updating a shopping list with the deficient food articles or packages, the invention results in accurate and automatic purchasing decisions. The shopping list can be directly communicated with a grocer or a food delivery agent that can save a user money and transit time. The invention leads to optimal food consumption that minimizes food wastage and simplifies management of logistics of grocery shopping and meal preparation. The identification of healthier food choices and recommending corresponding recipes and diet plans allows the user to save time invested in food preparation and/or procurement. The use of deep learning architectures by the GPU for identifying the food articles and/or the food packages present in the refrigerator allows fast and correct processing and analysis of the images that is time and effort efficient for the consumer.

The best mode of the invention is considered to be the refrigerator comprising the GPU, a light and a camera in each shelf of the refrigerator. The light remains on when refrigerator doors are closed to illuminate the food articles and/or food packages contained therein. The cameras capture images of the entire food content of the refrigerator. The GPU analyses the images to determine a quality, a quantity, and/or a kind of each food article and/or food package present in the refrigerator. The determined information may then be used, for example, for identifying a diet plan, recommending recipes, for posting on social media and/or for sending to nutritionist, identifying deficient food articles and/or packages, updating shopping lists and sending the same to grocers or food delivery agents, etc. in the best mode. In the best mode, the food articles are identified by the GPU with a deep learning algorithm that can be updated from a cloud server. In the best mode, deep learning image recognition is the primary identification method of food articles, and visual search based on image extracted text queries and/or image based queries is the auxiliary method of identification of the food articles.

BRIEF DESCRIPTION OF THE DRAWINGS

FIG. 2B demonstrates an embodiment 21 of a software program product user interface implemented in a user terminal device, in accordance with the invention as a screen shot diagram.

FIG. 3 demonstrates an embodiment 30 of a software program product user interface in accordance with the invention as a screen shot diagram.

FIG. 8A demonstrates an embodiment 80 of a software program product user interface showing food identification in accordance with the invention as a screen shot diagram.

Some of the embodiments are described in the dependent claims.

DETAILED DESCRIPTION OF EMBODIMENTS

The present disclosure provides a refrigerator system, a method, and a software program product for controlling and advising on a diet plan of a user. The diet plan may be suggested for a human or a mammal.

The refrigerator system comprises a refrigerator, a graphics processing unit (GPU), and a user terminal device. The refrigerator comprises at least one light that illuminates an interior surface of the refrigerator. Further, one or more cameras are installed in the refrigerator to capture images of food articles and/or food packages placed in the refrigerator. The GPU is configured to analyse the images and to recognise the food quantity, quality and/or kind from the image. In an embodiment, the GPU is installed in the refrigerator. In another embodiment, the GPU is integrated with a cloud server. The cloud server GPU receives the images from the refrigerator and analyses the images. The information derived from the analysis is used to provide, for example, a diet plan, recipe recommendations, grocery item deficiency notifications, shopping list updates, etc. Hence, the invention optimizes food procurement, preparation, and consumption and assists in managing logistics involved in the food procurement process.

Figure 1:
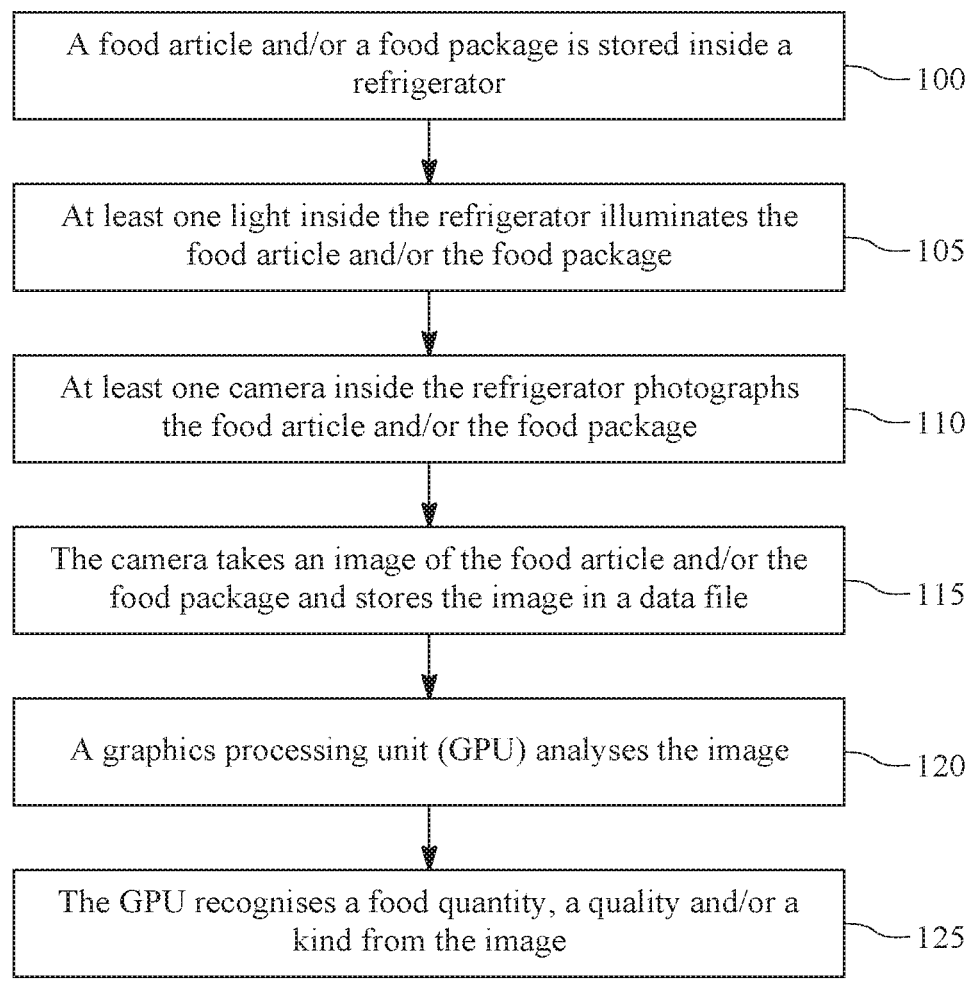
FIG. 1 demonstrates an embodiment 10 of a method for controlling and/or advising on a diet of a human and/or a mammal in accordance with the invention as a flow diagram.

FIG. 1 demonstrates an embodiment 10 of a method for controlling and/or advising on a diet of the user in accordance with the invention as a flow diagram. The method could be implemented in a system identical or similar to embodiment 20, 60, and 70 in FIG. 2A, FIG. 6, and FIG. 7 for example. The end-user of the method could use a user interface identical or similar to that disclosed with embodiment 21, 30, 80, 81, 90, 92, and 94 in FIG. 2B, FIG. 3, FIG. 8A, FIG. 8B, FIG. 9, FIG. 10B, and FIG. 11B.

The method for controlling and/or advising on the diet of the user inventively with a refrigerator typically features at least one refrigerator, the GPU, and a user terminal device communicating with each other via a network which is typically the wireless Internet relying on Wi-Fi or a cellular radio data connection. Alternatively, the user terminal device can be mounted into the refrigerator, for example in the door of the refrigerator. In an embodiment, the refrigerator comprises the GPU. In another embodiment, a cloud server comprises the GPU.

In phase 100, at least one food article and/or a food package is stored in the refrigerator. The food article may be, for example, a vegetable, a fruit, a beverage, meat, eggs, fish, bread, a dairy product, etc. The food package may be a packaged form of any of the abovementioned food articles, for example, packaged beverages, packed vegetables, water bottles, etc. The food article and/or the food package may hereinafter be referred to as "food items".

In phase 105, at least one light installed in the refrigerator is used to illuminate the food items placed in the refrigerator. More than one light may be installed in the refrigerator such that all interior surfaces of the refrigerator that may be used to store the food articles are visibly illuminated by light. In an embodiment, the light is positioned on an internal wall of the refrigerator. In another embodiment, the internal wall is a transparent wall such that light emerges from the wall that may illuminate the interior surfaces of the refrigerator.

In phase 110, at least one camera installed in the refrigerator photographs images of the food items. If there is one camera installed in each shelf of the refrigerator, each camera captures (synchronously or asynchronously) images of the contents of each shelf. In an example implementation, the refrigerator may comprise multiple cameras such that the food items stored in each shelf of the refrigerator can be captured by the at least one camera.

In phase 115, the at least one camera takes an image of the food items. In this phase 115, the captured images are stored in a data file. In one embodiment, the data file may be saved in a memory unit of a control unit of the refrigerator. In another embodiment, the data file is stored in a cloud based database of the cloud server implemented in a cloud computing environment. In an example, the data file may be an image file, a video file, a multimedia file, etc. The data file may be, for example, of a JPEG format, a PNG format, a GIF format, an MPEG format etc. In one embodiment, the captured images are stored in other memory mediums such as a removable storage device.

In phase 120, the GPU analyses at least one captured image. In an embodiment, the captured image is analysed using deep learning architecture. In another embodiment, the GPU may perform a visual search on the captured image by using search query terms such as image terms or text terms to identify food package and corresponding information. In another embodiment, the GPU may use any of conventional image analysis techniques, for example, object recognition, image segmentation, feature extraction, optical character recognition (OCR), object-based image analysis, etc. For example, if a food package has a bar code printed on the package, the GPU may use OCR technique to read the bar code and identify the food package and information associated with the food package such as, expiry date, calorie information, quantity, etc. Also text can be extracted by OCR from the packages to formulate textual query terms in accordance with the invention.

In phase 125, the GPU recognizes a food quality, a food quantity, and/or a food kind from the analysis of the image. For example, the GPU may use a deep learning architecture such as convolutional neural networks to correctly recognize a food item, recognize whether a food item is stale or fresh, estimate a weight of the food item, determine a type of the food item, etc. In an embodiment, the GPU may use the image analysis techniques or perform a visual search by using query terms to recognize the food quality, food quantity, and/or food kind from the analysis of the image. For example, by extracting suitable query terms with the GPU the system can identify the food package and retrieve all information about the food package from the Internet.

In an example implementation, the GPU may use convolutional neural networks for identifying the food item. The GPU may be trained before installing the GPU in the refrigerator system. For example, the GPU is inputted with 1000 images of a food article such as, a broccoli during the training phase. The images may be of broccoli of different sizes or shapes of broccoli flower heads and/or stalk, different kinds of broccoli such as, Calabrese broccoli, sprouting broccoli, purple broccoli, etc., with different degrees of rawness, etc. The GPU analyses the images to identify different features of broccoli such as, weight, colours, shapes, sizes, types, rawness, etc. The GPU compares each image with another to identify similarities between multiple varieties of broccoli. With the training, the GPU is enabled to recognize broccoli of any kind. The GPU is inputted with broccoli characteristics to successfully identify broccoli of any kind that may be present in the refrigerator.

Any features of embodiment 10 may be readily combined or permuted with any of the other embodiments 20, 21, 30, 40, 41, 42, 50, 60, 70, 80, 81, 90, 91, 92, 93, and/or 94 in accordance with the invention.

Figure 2A:
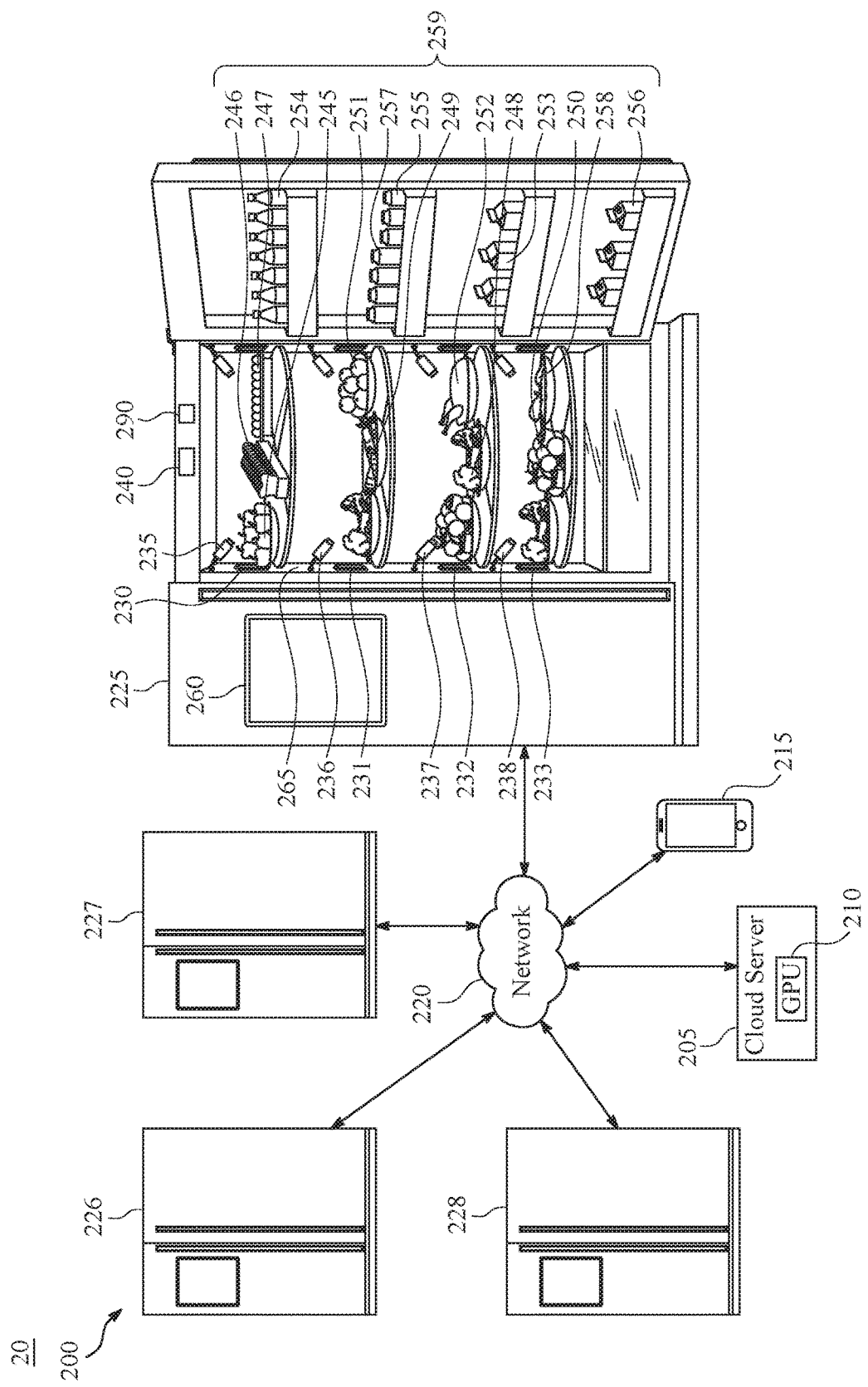
FIG. 2A demonstrates an embodiment 20 of a refrigerator system in accordance with the invention as a block diagram.

FIG. 2A demonstrates an embodiment 20 of the refrigerator system 200 in accordance with the invention as a block diagram. The refrigerator system 200 comprises the user terminal device 215, a GPU 210 or 240, and the refrigerator 225. In an embodiment, the GPU 240 is installed in the refrigerator 225. In another embodiment, the GPU 210 is integrated with the cloud server 205.

In an example, the cloud server 205 may comprise a plurality of servers (not shown). In an example implementation, the cloud server 205 may be any type of a database server, a file server, a web server, an application server, etc., configured to store data files of images of the food items 259. In another example implementation, the cloud server 205 may comprise a plurality of databases for storing the data files. The databases may be, for example, a structured query language (SQL) database, a NoSQL database such as the Microsoft® SQL Server, the Oracle® servers, the MySQL® database, etc. The cloud server 205 may be deployed in a cloud environment managed by a cloud storage service provider, and the databases may be configured as cloud based databases implemented in the cloud environment.

The cloud server 205 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realise the cloud network used by the cloud server 205 of the invention. The cloud server 205 can be purchased as a separate solution from known vendors such as Microsoft and Amazon and HP (Hewlett-Packard). The cloud server 205 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server 205 is preferred despite its high cost due to the reduced latency that is required and/or preferred for rendering diet plans, recipe recommendations, shopping list updates, etc. For example, when a user is accessing a recipe via a user interface of the refrigerator 225 in Helsinki, there is no need to retrieve recipe details from a hard drive in San Francisco that would hamper food preparation experience. Instead the recipe information is pulled from a Flash storage in Munich, Hamina or Stockholm, where the pan-global server farms with flash based capabilities might be located.

The user terminal device 215 may be configured as a mobile terminal computer, typically a smartphone and/or a tablet that is used to send images of the food items 259 to the refrigerator 225, receive shopping list of deficient food items from the refrigerator 225, etc. The user terminal device 215 is typically a mobile smartphone, such as iOS, Android or a Windows Phone smartphone.

However, it is also possible that the user terminal device 215 is a mobile station, mobile phone or a computer, such as a PC-computer, Apple Macintosh-computer, PDA-device (Personal Digital Assistant), or UMTS- (Universal Mobile Telecommunication System), GSM- (Global System for Mobile Telecommunications), WAP- (Wireless Application Protocol), Teldesic-, Inmarsat-, Iridium-, GPRS- (General Packet Radio Service), CDMA- (Code Division Multiple Access), GPS- (Global Positioning System), 3G-, 4G-, Bluetooth-, WLAN- (Wireless Local Area Network), Wi-Fi and/or WCDMA (Wideband Code Division Multiple Access)-mobile station. Sometimes in some embodiments the user terminal device 215 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The refrigerator 225 and the user terminal device 215 communicate with the cloud server 205 via the network 220. The network 220 used for the communication in the invention is the wireless or wireline Internet or the telephony network, which is typically a cellular network such as UMTS- (Universal Mobile Telecommunication System), GSM- (Global System for Mobile Telecommunications), GPRS- (General Packet Radio Service), CDMA- (Code Division Multiple Access), 3G-, 4G-, Wi-Fi and/or WCDMA (Wideband Code Division Multiple Access)-network.

The refrigerator 225 comprises at least one light 230, 231, 232, or 233, at least one camera 235, 236, 237, or 238, and the GPU 240. The refrigerator 225 comprises multiple shelves configured to store different varieties of the food items 259 therein. The food items 259 may comprise, for example, apples 245, bread 246, eggs 247, broccoli 248, carrots 249, tomatoes 250, oranges 251, chicken 252, milk cartons 253, mayonnaise 254, butter 255, a fruit juice pack 256, French dressing 257, fish 258, etc. The refrigerator 225 may comprise more than one light, for example, 230, 231, 232, 233, etc. In an embodiment, the lights 230, 231, 232, or 233 may be fixed at a suitable position to an internal wall 265 of the refrigerator 225. In another embodiment, the internal wall 265 is a transparent wall such that light emerges from the internal wall 265 to illuminate the inside of the refrigerator 225. In an example implementation, each shelf of the refrigerator 225 is illuminated with at least one light 230, 231, 232, 233 as depicted in FIG. 2A, such that each food item 259 present in the shelf is illuminated by the light 230, 231, 232, or 233. The light 230, 231, 232, or 233 may be, for example, a halogen lamp, a fluorescent lamp, a metal halide lamp, an electrodeless lamp, an LED, an incandescent bulb, a light bulb, etc.

In an example implementation, the light 230, 231, 232, or 233 is configured to remain in an illuminating state when a door of the refrigerator 225 is closed. In another example implementation, the light 230, 231, 232, or 233 is activated periodically and the camera 235, 236, 237, or 238 is configured to capture images of the food items 259 synchronously with the activation of the light 230, 231, 232, or 233. In an example, the light 230, 231, 232, or 233 may be activated in a period of seconds, minutes, hours, days, etc. The activation period of the light 230, 231, 232, or 233 may be programmed into the refrigerator system 200 or may be manually programmed by the user. For example, a timer interface (not shown) may be displayed on the display screen 260 of the refrigerator 225 to allow the user to set a timer for the activation of the light 230, 231, 232, or 233 and/or the camera 235, 236, 237, or 238. In another example, the timer interface may be accessible on the user terminal device 215.

At least one internal wall 265 of the refrigerator 225 accommodates the camera 235, 236, 237, or 238. In an example implementation, each shelf of the refrigerator 225 has the camera 235, 236, 237, or 238 affixed to an internal wall 265 of the shelf, as depicted in FIG. 2A. The camera 235, 236, 237, or 238 may be, for example, a pinhole camera, a digital camera, a remote camera, a lipstick camera, cameras with CMOS sensors, cameras with CCD sensors, etc.

In an embodiment, the refrigerator 225 comprises a control unit (not shown). In an example implementation, the control unit comprises the GPU 240, a central processing unit (CPU) 290, a memory unit, a communication interface, etc. Although the invention is described hereinafter with reference to the CPU 290 performing some computer programs and/or instructions and the GPU 210/240 performing some computer programs and/or instructions, it is to be understood that both the CPU 290 and the GPU 210/240 may be used interchangeably to perform different computer programs and/or instructions within the scope of the invention.

The GPU 210 or 240 may refer to an electronic circuit designed to manipulate and alter computer graphics, images, and memory to accelerate the creation of images in a frame buffer intended for output to a display. GPUs are used in embedded systems, mobile phones, personal computers, workstations, game consoles, etc. The GPU 210 or 240 may be selected, for example, from AMD GPUs, Nvidia GPUs, Intel GPUs, Intel GMA, Larrabee, Nvidia PureVideo, SoC, etc.

The CPU 290 may refer to any one or more microprocessors, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The CPU 290 may also be implemented as a processor set comprising, for example, a general purpose microprocessor and a math or graphics co-processor. The CPU 290 may be selected, for example, from the Intel® processors such as the Itanium® microprocessor or the Pentium® processors, Advanced Micro Devices (AMD®) processors such as the Athlon® processor, UltraSPARC® processors, microSPARC™ processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The control unit disclosed herein is not limited to employing the CPU 290. The control unit may also employ a controller or a microcontroller and other electronics components.

The memory unit is used for storing programs, applications, data, etc. The memory unit is, for example, a random access memory (RAM) or another type of dynamic storage device that stores information and instructions for execution by the GPU 210 or 240 and/or CPU 290. The memory unit also stores temporary variables and other intermediate information used during execution of the instructions by the GPU 210 or 240 and/or CPU 290. The control unit may further comprise a read only memory (ROM) or another type of static storage device that stores static information and instructions for the GPU 210 or 240 and/or CPU 290.

In an embodiment, the GPU 240 is installed in the refrigerator 225. In this embodiment, the results of the analysis are stored in the local memory unit of the refrigerator 225 and may also be transmitted to the cloud server 205 via the network 220 to be stored in the cloud database. In another embodiment, the GPU 240 is a stand-alone card communicatively coupled to the CPU 290. In another embodiment, the GPU 240 and the CPU 290 are integrated in a single chipset.

In an embodiment, the refrigerator 225 is a stand-alone system that does not communicate with the cloud server 205. The camera 235, 236, 237, or 238 takes an image of the food items 259 stored in the refrigerator 225. The image may be stored in a data file in the local memory unit of the refrigerator 225. The GPU 240 analyses the image to recognize food quantity, quality and/or kind of the food items 259 from the image by using the deep learning data files and/or by performing a visual search. The images captured by the cameras 235, 236, 237, and/or 238, the deep learning data files, deep learning data sets and models, recipe recommendations, diet plans, shopping lists, etc., are stored in the local memory unit. In an embodiment, the deep learning data files, the deep learning data sets and models may be periodically updated when the refrigerator 225 is connected to an external computer (for example, a server) or an external storage device via the Internet. The update may be performed during maintenance of the refrigerator 225. In an example implementation, the control unit of the refrigerator 225 may be connected to the Internet via the network 220 or via a separate network (not shown) such as Wi-Fi to receive the update.

In another embodiment, the GPU 210 is integrated with the cloud server 205. In this embodiment, the refrigerator 225 sends the captured images to the cloud server 205 via the network 220. The cloud GPU 210 analyses the images and the cloud server 205 transmits the results of the analysis to the refrigerator 225 via the network 220 to be displayed via the user interface. In some embodiments, the cloud GPU 210 is configured to receive images from multiple refrigerators 225, 226, 227, 228, etc. The GPU 210 analyses the images for multiple refrigerators 225, 226, 227, 228, and the cloud server 205 sends the information concerning the identified contents to each refrigerator 225, 226, 227, or 228, so that there is no need for every refrigerator 225, 226, 227, and/or 228 to have an individual GPU 240. By sharing the GPU 210 in the cloud, the use of the GPU 210 is maximised and there is only a fractional cost of the GPU 210 to distribute to each refrigerator 225, 226, 227, and 228.

In some embodiments the refrigerator 225 may have one or multiple GPUs, or may be supported by one or multiple GPUs in the cloud server 205, or both. For example, in one embodiment, certain types of images e.g., low light are distributed to one GPU and different types of images e.g., high intensity light are distributed to another GPU trained in processing high light intensity images. The image processing tasks can also be distributed among GPU 240 or GPUs in the refrigerator 225 and a GPU 210 or GPUs in the cloud server 205. For example, easily processed images could be processed in the GPU 240 of the refrigerator 225 and more difficult images could be sent to the cloud server 205 for processing by more developed GPUs.

Each camera 235, 236, 237, 238 is configured to capture images of the food items 259 stored in each shelf of the refrigerator 225. The images are stored in data files. The data files may be stored in digital and/or analog form. In an embodiment, the data files are stored in the local memory unit of the refrigerator 225. In another embodiment, the data files are sent to the cloud server 205 via the network 220 to be stored in a cloud database or other data storage system.

The GPU 210 or 240 is configured to analyse the images. In an embodiment, the GPU 210 or 240 may employ deep learning techniques alone, for example, deep neural networks, convolutional deep neural networks, deep belief networks, recurrent neural networks, etc., for identifying the food items 259 from the images. In another embodiment, the GPU 210 or 240 may use conventional image analysis techniques such as, object recognition, image segmentation, optical character recognition, object-based image analysis, feature extraction, etc., to recognize a food quantity, a food quality, a food type, etc., from the images. In another embodiment, the GPU 210 or 240 may perform visual search alone based on the image by using image or text query terms to recognize the food items 259.

In a preferred embodiment the GPU 210 or 240 may employ both deep learning techniques and the visual search technique in combination to recognize the food items 259. Most preferably the GPU 210 or 240 may employ the deep learning technique as a primary method and the visual search technique as a secondary method for recognizing the food items 259.

The refrigerator 225 comprises a display screen 260. The display screen 260, via a graphical user interface (GUI) displays information, display interfaces, user interface elements such as text fields, checkboxes, text boxes, windows, etc., for allowing the user to view and access diet plans, recipe recommendations, shopping lists, manually update contents of the refrigerator 225, etc. The display screen 260 comprises, for example, a liquid crystal display, a plasma display, an organic light emitting diode (OLED) based display, etc. In an embodiment, an input device may be provided to allow the user to input data via the GUI. For example, the user may input personal diet preferences, allergies to the food items 259, provide images of savouries, etc., using the input device. The input device may be, for example, a microphone, a touch pad, a light pen, a physical button, a touch sensitive display device, a track ball, any device capable of sensing a tactile input, etc. The aforementioned data may also be inputted by mobile phone or computer in some embodiments, for example with a smartphone app, or a computer application.

Any features of embodiment 20 may be readily combined or permuted with any of the other embodiments 10, 21, 30, 40, 41, 42, 50, 60, 70, 80, 81, 90, 91, 92, 93, and/or 94 in accordance with the invention.

FIG. 2B demonstrates an embodiment 21 of a software program product user interface 270, 275, 280, or 285 implemented in a user terminal device 215, in accordance with the invention as a screen shot diagram. This could be for example displayed on a display screen 261 of a tablet or a smartphone. In another example, the software program product user interface 270, 275, 280, or 285 may be displayed on a screen on a front door of the refrigerator 225. The refrigerator system 200 behind the user interface 270, 275, 280, or 285 could be e.g. embodiment 20, 60, and 70 explained with respect to FIG. 2A, FIG. 6, and FIG. 7, respectively.

The software program product is stored on a non-transient memory medium on at least one of the refrigerator 225, the cloud server 205, and the user terminal device 215. The software program product may also be distributed between the refrigerator 225, the cloud server 205, and the user terminal device 215, so that some parts of the software program product reside on the refrigerator 225, and/or some parts of the software program product reside on the cloud server 205, and/or some parts of the software program product reside on the user terminal device 215.

The user terminal device 215 provides an application 263 to allow the user to access images of contents of the refrigerator 225, view shopping lists, recipes recommendations, diet plans, etc. Preferably the user downloads the application 263 from the Internet, or from various app stores that are available from Google, Apple, Facebook and/or Microsoft. For example, in some embodiments an iPhone user with a Facebook application on his phone will download the application 263 that is compatible with both the Apple and Facebook developer requirements. Similarly, a customized application 263 can be produced for other different handsets.

The user logs into the application 263 installed in the user terminal device 215 via a user interface (not shown). The application 263 allows the user with access to the refrigerator system 200. The application 263 may be downloaded by the user from an application store such as Google Play Store, Apple iTunes, etc. or from a website of a provider deploying the refrigerator system 200. In an example implementation, the user may send images of food items from his/her social networking application 270 such as, Instagram. The user may capture an image 262 of a pizza the user had for dinner at an Italian restaurant using a camera of the user terminal device 215. The user may upload the image 262 to his/her Instagram account. The application 263 may be integrated with the user's Instagram application 270 such that the image 262 may be sent to the GPU 210 or 240 via the network 220. The GPU 210 and/or 240 recognizes an image of any food item, for example, the image 262 of the pizza stored in the application 270. The GPU 210 and/or 240 recognizes the image 262 to be of a smoked salmon pizza by using the deep learning algorithm and/or any image recognition technique employed by the refrigerator system 200 as explained in the detailed description of FIG. 4A, FIG. 4B, and FIG. 4C. The GPU 210 and/or 240 extracts information associated with the image 262 such as, ingredients of the pizza, number of servings per pizza, and a recipe for preparing the smoked salmon pizza, etc., by using the image 262, parts of the image 262, or recipe name as query terms to search the Internet. For example, once the GPU 210 and/or 240 recognizes the image 262 to be of the smoked salmon pizza, the CPU 290 searches the Internet for recipe details, ingredient information, etc. The CPU 290 extracts the information from the Internet and displays the extracted information on the user interface 275.

In another example implementation, the application 263 is integrated with another social networking application 280 such as, Facebook. The CPU 290 sends information of the food items 259 present in the refrigerator 225 to the application 263 installed on the user terminal device 215 via the network 220. The application 263 posts the food information on the user's wall of the Facebook application 280. The user's fitness trainer who can view the user's posts on the application 280 views the food information and provides comments, for example, suggests healthier food items 259 that the user should have to maintain fitness. For example, the post depicts that the user's refrigerator 225 contains burger buns, pasta sauce, pasta, etc., which the trainer considers unfit for the user's health. The trainer comments on the user's post to switch to oats, salmon, avocado, and carrots instead. The application 263 extracts the trainer's comment from the user's Facebook application 280 and sends it to the CPU 290. The CPU 290 updates the shopping list generated by the CPU 290. The changed shopping list is displayed to the user for approval via the user interface 285. If the user approves the suggested items and pays for the items in cart, the CPU 290 sends the shopping list to a grocer. The CPU 290 stores the trainer's suggested items for future reference such that the next iteration of shopping list also contains all or some of the suggested food items 259.

Any features of embodiment 21 may be readily combined or permuted with any of the other embodiments 10, 20, 30, 40, 41, 42, 50, 60, 70, 80, 81, 90, 91, 92, 93, and/or 94 in accordance with the invention.

FIG. 3 demonstrates an embodiment 30 of a software program product user interface 300, 305, 310, or 315 in accordance with the invention as a screen shot diagram. This could be displayed for example on a display screen 260 on a front door of the refrigerator 225. In another example not depicted in FIG. 3, the software program product user interface 300, 305, 310, or 315 may be displayed on the screen 261 of a tablet or a smartphone. The refrigerator system 200 behind the user interface 300, 305, 310, or 315 could be e.g. embodiment 20, 60, and 70 explained with respect to FIG. 2A, FIG. 6, and FIG. 7, respectively.

The software program product is stored on a non-transient memory medium on at least one of the refrigerator 225, the cloud server 205, and the user terminal device 215. The software program product may also be distributed between the refrigerator 225, the cloud server 205, and the user terminal device 215, so that some parts of the software program product reside on the refrigerator 225, some parts of the software program product reside on the cloud server 205, and some parts of the software program product reside on the user terminal device 215.

The software program product is operable with the refrigerator 225, the cloud server 205 and/or the user terminal device 215 via the network 220. Typically, the user terminal device 215 and the refrigerator 225 are configured to have an application (for example, the application 263 of the user terminal device 215) installed that allows the user to access the diet plans, the shopping lists, the recommended recipes, etc. The application user interface could be the user interface 300, 305, 310, or 315 of the aforementioned application 263. In an example, the application 263 may be configured as a virtual reality software application that provides a touch sensitive interface for allowing the user to access the diet plans, the shopping lists, the recommended recipes, or provide food preferences, etc.

Consider an example where a consumer places a week's grocery in the refrigerator 225. Vegetables such as, broccoli, avocado, tomato, zucchini, carrots, onions, ginger, etc., are placed on one shelf of the refrigerator 225. Similarly, fruits such as, oranges, apple, grapes, etc., are placed on another shelf; and meat, poultry, and seafood items such as, chicken, fish, salmon, eggs, etc., are placed on another shelf. Packaged items such as, fresh cream, milk cartons, fresh juice packs, butter, cheese, etc., are placed on a side shelf of the refrigerator 225. Water bottles, beverages, alcoholic drinks, etc., may be placed on another side shelf of the refrigerator 225. Each shelf of the refrigerator 225 is equipped with a built-in camera 235, 236, 237, or 238 and an LED light 230, 231, 232, or 233 positioned on a side wall of the respective shelves. Each time refrigerator doors close, the light 230, 231, 232, or 233 illuminates a shelf where the light 230, 231, 232, or 233 is placed. The cameras 235, 236, 237, and 238 may capture images of the food items 259 in each shelf periodically such as every hour. The captured images are displayed on the user interface 300.

In an embodiment, the cloud GPU 210 receives the images from multiple refrigerators 225, 226, 227, and/or 228, and the cloud GPU 210 analyses the images to recognize the food items 259 present in the refrigerators 225, 226, 227, and/or 228, so that there is no need for every refrigerator 225, 226, 227, and/or 228 to have an individual GPU 240. Hence, the refrigerators 225, 226, 227, and/or 228 are made economical with reduced memory requirement and efficient processing capabilities as the usage of the cloud GPU 210 is maximised.

The GPU 210 or 240 processes and analyses the images using deep learning techniques such as, deep neural networks, convolutional deep neural networks, deep belief networks, recurrent neural networks, etc., to recognize the food items 259 present in the refrigerator 225 and extract information associated with the food items 259.

In an embodiment, the GPU 210 or 240 may process and analyze the images using image analysis techniques such as object identification, visual searches by using image query terms or query text terms, OCR methods, etc., to recognize the food items 259 present in the refrigerator 225 and extract information associated with the food items 259. The information associated with the food items 259 such as, an expiry date, quantity, name and type of food, weight, calorie information, etc., are displayed in the user interface 305. In an embodiment, based on the recognized food items 259 the CPU 290 may suggest recipes to the user via a user interface 310. For example, on recognizing that chicken, tomato, onions, ginger, etc., are present in the refrigerator 225 the CPU 290 may recommend a chicken curry recipe to the user. The CPU 290 may use names, images, or parts of images of the recognized food items 259 as query terms to search for recipes from the Internet.

In an embodiment, the CPU 290 may determine deficiencies in the food items 259 based on pre-fed grocery preferences of the user. For example, the CPU 290 has access to pre-stored data associated with the user's grocery list for a week. In some embodiments this list is configured to rotate or "Shuffle" in order to introduce some random variability to the weekly menu, similar to how computer generated playlists introduce variability to background music within some limits. The GPU 210 or 240 and/or the CPU 290 compares the images of the food items 259 present in the refrigerator 225 with the grocery list to determine the food items 259 missing from the refrigerator 225. The CPU 290 updates a shopping list with details such as, a name, a type, a quantity, etc., of the deficient food items 259. The updated shopping list is displayed in the user interface 315.

Any features of embodiment 30 may be readily combined or permuted with any of the other embodiments 10, 20, 21, 40, 41, 42, 50, 60, 70, 80, 81, 90, 91, 92, 93, and/or 94 in accordance with the invention.

Figure 4A:
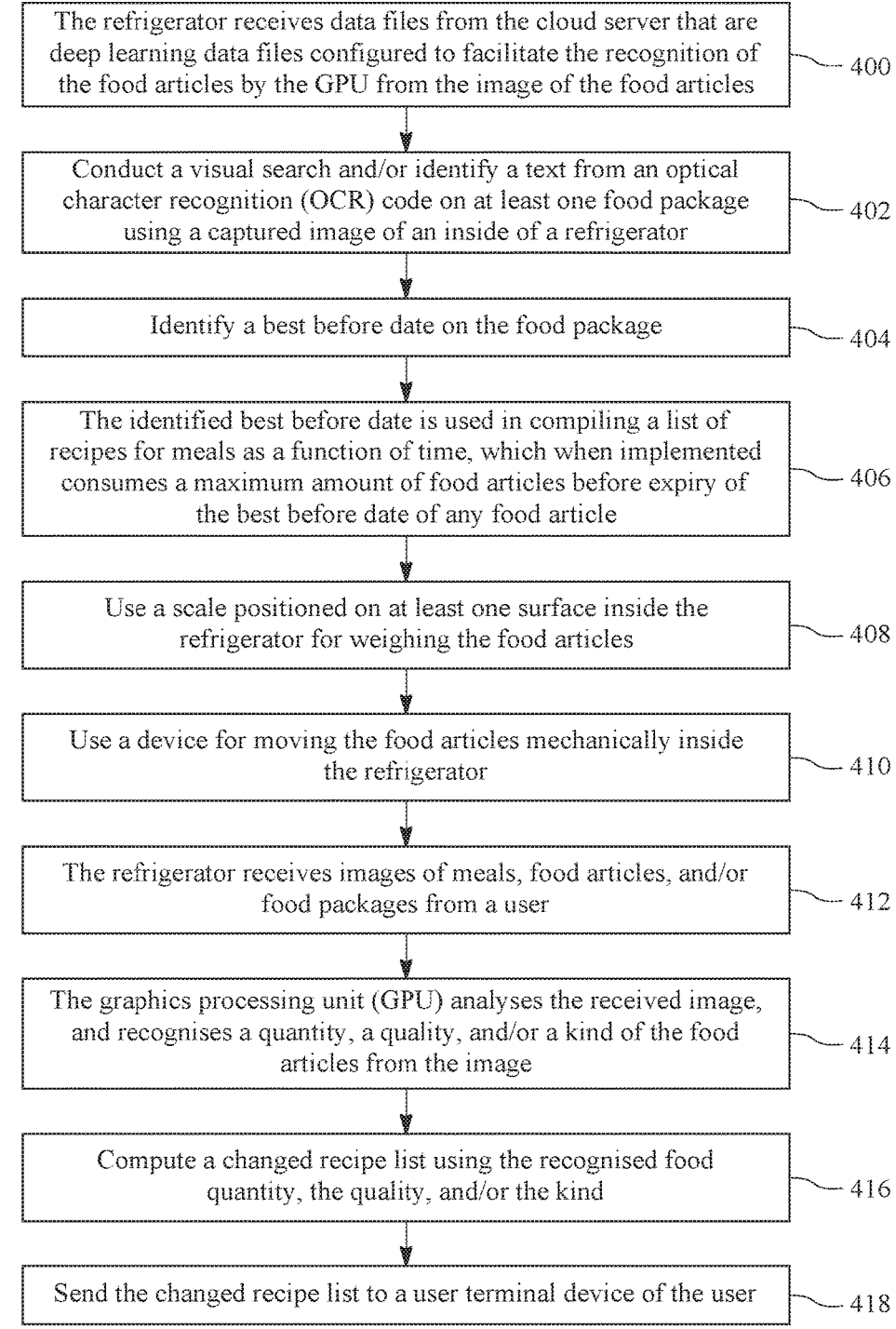
FIG. 4A demonstrates an embodiment 40 of a more elaborate method for identifying food articles and/or food packages present in a refrigerator, in accordance with the invention as a flow diagram.

FIG. 4A demonstrates another embodiment 40 of a more elaborate method for identifying the food items 259 present in the refrigerator 225, in accordance with the invention as a flow diagram. The method could be implemented in a system identical or similar to embodiment 20, 60, and 70 in FIG. 2A, FIG. 6, and FIG. 7 for example. The end-user of the method could use a user interface identical or similar to that disclosed with embodiment 21, 30, 80, 81, 90, 92, and 94 in FIG. 2B, FIG. 3, FIG. 8A, FIG. 8B, FIG. 9, FIG. 10B, and FIG. 11B.

In phase 400, the GPU 210 or 240 and/or CPU 290 receives data files from the cloud server 205. In an embodiment, the data files are deep learning data files configured to facilitate recognition of the food items 259 by the GPU 210 or 240 from the image of the food items 259. One embodiment of the process of recognizing the food items 259 using the deep learning data files is explained in the description of FIG. 4B.

In an embodiment, in phase 402 a visual search is conducted on an image captured by the camera 235, 236, 237, or 238 of the food items 259 contained in the refrigerator 225. One embodiment of recognizing the food items 259 using the visual search technique is explained in detail in the description of FIG. 4C. The visual search may include optical identification such as identifying information associated with a quantity, a quality, or a kind of the food items 259 by scanning QR code, an OCR code, an RFID tag, a bar code, etc. Also, in one embodiment the visual search may involve searching the Internet or a database with the captured image, or a part of the captured image as a query term in a visual search index process. In this search process, the query image is compared to an index of result images or a reservoir of result images and the images that have the highest relevance to the query involving the captured image are returned as search results. In another embodiment, in phase 402 textual information printed on a food package such as a bread packet 246 may be identified from the image. The textual information may be scanned or object character recognized (OCR) to identify the information associated with the quantity, the quality, or the kind of the food packages present in the image. The textual information may comprise, for example, a best before date, a quantity, calorie information, ingredients information, etc., printed on the food packages. A query involving an image query term and a query text term is also in accordance with the invention. The different types of query terms can be used in a mix, as described in the publication WO 2011/020742 A1, from the current inventor, which is included here as reference.

In an embodiment, the GPU 210 or 240 may employ only deep learning techniques, for example, deep neural networks, convolutional deep neural networks, deep belief networks, recurrent neural networks, etc., for identifying the food items 259 from the images. In another embodiment, the GPU 210 or 240 may use conventional image analysis techniques such as, object recognition, image segmentation, optical character recognition, object-based image analysis, feature extraction, etc., to recognize a food quantity, a food quality, a food type, etc., from the images. In another embodiment, the GPU 210 or 240 may perform only visual search based on the image by using image or text query terms to recognize the food items 259. Preferably the GPU 210 or 240 may employ both deep learning techniques and the visual search technique to recognize the food items 259. Most preferably the GPU 210 or 240 may employ the deep learning technique as a primary method and the visual search technique as a secondary method for recognizing the food items 259.

In phase 404, a best before date on the food packages is identified. The best before date is identified by the deep learning technique, the visual search, the scanning of the textual information, or by using the search query terms or images. The recognized best before date is used in compiling a list of recipes for meals as a function of time in phase 406. The list of recipes is compiled as a function of time to ensure that maximum amount of food is consumed before the best before date of the food items 259 expires and/or to ensure that the more expensive food items 259 are consumed before expiry.

In phase 408, an in-built scale of the refrigerator 225 is used to weigh the food items 259. In an example implementation, the scale is installed in each shelf of the refrigerator 225 such that when any food item 259 is placed in the refrigerator 225 the weight of the food item 259 may be measured simultaneously. Further, a device such as a trolley is installed in the refrigerator 225 to facilitate movement of the food items 259 inside the refrigerator 225 in phase 410. In an example, the trolley may move in a clockwise or an anti-clockwise direction to place a food item 259 in a front section of the refrigerator 225 that may be easily accessible by the user. Hence, the user need not dig into the refrigerator 225 for searching for any food item 259. The trolley may present the food in the order of the recipe list in some embodiments.

In phase 412, the refrigerator system 200 receives images of meals with the food items of the kind 259 present in the meal from the user terminal device 215 used by the user. For example, the user takes an image of an apple sandwich. The images may be received by the GPU 240 and/or CPU 290 integrated in the refrigerator 225 or the GPU 210 integrated in the cloud server 205. This allows the user to inform the refrigerator system 200 about the meals the user has had. In some embodiments the cloud GPU 210 is configured to receive images from multiple refrigerators 225, 226, 227, and/or 228, and the cloud GPU 210 analyses the images for multiple refrigerators 225, 226, 227, and/or 228, and sends the information concerning the identified contents to each refrigerator 225, 226, 227, and/or 228, so that there is no need for every refrigerator 225, 226, 227, and/or 228 to have an individual GPU 240.

The GPU 210 or 240 analyses the received image and recognizes a food quantity, a quality, and/or a kind from the image in phase 414. The GPU 210 or 240 sends the information about the food quality, quantity and/or the type to the CPU 290. In phase 416, the CPU 290 uses the food quantity, quality and/or kind from the image to compute a changed recipe list. In phase 418, the CPU 290 may send the changed recipe list to the user terminal device 215. For example, the user may send an image of a pizza to the refrigerator system 200 to indicate that the user ate a pizza for lunch on a given day. The GPU 210 or 240 analyzes the image and identifies that the user had pizza for lunch. The GPU 210 or 240 also identifies the ingredients, calorie information, recipe information, etc., from the image. The CPU 290 determines that the user was about to have pizza for dinner based on the diet plan stored in the refrigerator 225, the user terminal device 215, or the cloud server 205. The CPU 290 changes the recipe list for dinner so that the user does not eat pizza for dinner too. The CPU 290 may instead suggest roast chicken with bread for dinner. The CPU 290 sends the updated recipe list to the user terminal device 215.

Figure 4B:
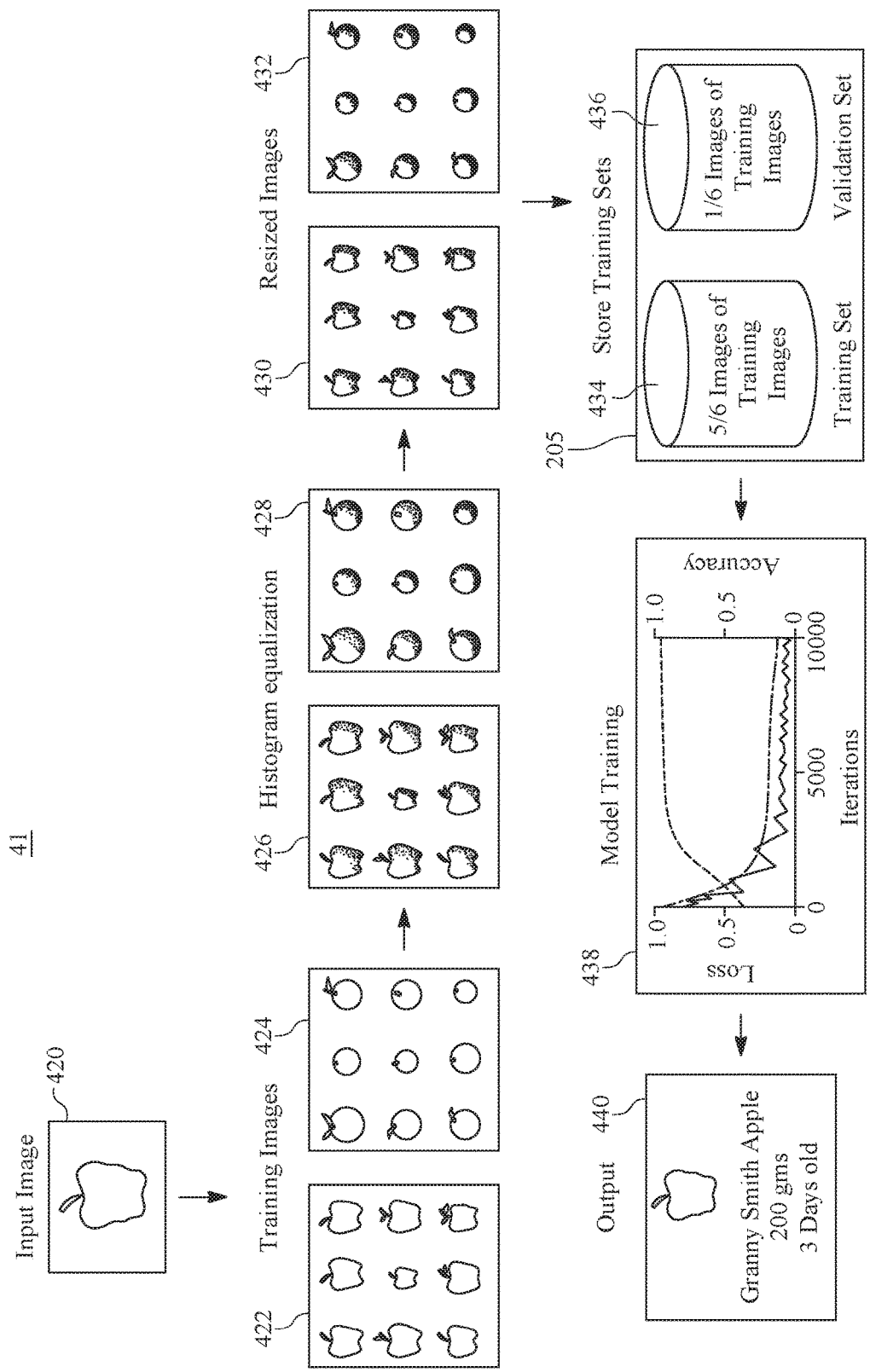
FIG. 4B demonstrates an embodiment 41 of a method for using a deep learning algorithm for identifying the food items present in the refrigerator, in accordance with the invention as a diagram.

FIG. 4B demonstrates an embodiment 41 of a method of using a deep learning algorithm to identify the food items 259 present in the refrigerator 225, in accordance with the invention as a diagram.

Consider an example of using convolutional neural networks (CNN) for recognizing a food item such as an apple 245 stored in the refrigerator 225. CNN refers to artificial neural networks that model visual perception by an animal or a human. The CNN algorithms may be employed for image recognition tasks. The CNN comprises multiple layers of receptive fields that are small neuron collections configured to process portions of an input image. The output of each layer is successively tiled such that the input regions overlap to obtain a representation of the original image. In an embodiment, a deep learning framework called Caffe that uses C++, MATLAB, and Python programming languages is used for implementing the CNN. Caffe is a CNN library that is configured to support both CPU 290 and GPU operations. In this example, the GPU 210 or 240 used by the refrigerator system 200 may be a NVIDIA GPU with 15 GB RAM.

A pre-defined dataset comprising, for example, 30000 images 422 and 424 of apples and oranges is used as a training dataset for training the network. The training dataset comprises labels associated with each image 422 or 424. In an example, the training dataset is downloaded from Kaggle which is a predictive modelling and analytics platform. The labelled images 422 and 424 are pre-processed and stored in a Python script format.

In this example, the GPU 210/240 executes histogram equalization on the labelled images 422 and 424 of the training dataset. Histogram equalization is a technique used to adjust image intensities by using the image's histogram features. Histogram equalization enhances contrast of the images 422 and 424. The images resulting after histogram equalization of the images 422 and 424 are illustrated by images 426 and 428, respectively. The GPU 210/240 performs image resizing to resize the images 426 and 428, for example, to a 227×227 format. The resultant images are illustrated by images 430 and 432, respectively. Each image 430 and 432 is labelled after performing the histogram equalization. The training dataset is then divided into 2 subsets. First subset called the training set 434 comprises $5/6^{th}$ portion of the training images 430 and 432 that are used for training a model. The second subset called the validation set 436 comprises $1/6^{th}$ portion of the training images 430 and 432 that are used for calculating and validating accuracy of the model. The subsets 434 and 436 are stored in the cloud database of the cloud server 205.

Features such as, histogram of oriented gradients (HoG), Scale-invariant feature transform (SIFT), etc., of the images are extracted from the training images 430 and 432 by using a feature extraction software such as, MATLAB. The extracted image features provide a description of features of an object present in an image 430 or 432 that are used in image classification. Once the subsets 434 and 436 are created, the GPU 210/240 generates the mean image for the training data. The GPU 210/240 subtracts the mean image from each input image of the training set 434. The GPU 210/240 then performs feature standardization to make each feature in the dataset have a zero mean and a standard deviation of 1 such that all image data features are normalized. Feature standardization is used to ensure that measurement comparisons between features that may have different units (such as audio signals and pixel values of the image data) are normalized. In feature standardization the image features are centred on a zero mean with a standard deviation of 1. The mean image of the training set 434 is calculated. The mean image is subtracted from each image in the training set 434. The resulting value of each image is divided by its standard deviation. The resulting value of each image feature is hence normalized and can be further used for creating the training model.

The GPU 210/240 then defines the training model by selecting CNN architecture. In this example, the GPU 210/240 uses a CNN architecture model such as, Alexnet for defining the model. Alexnet is a CNN framework executed on GPUs implemented in CUDA. CUDA is a parallel computing platform and an application programming interface (API) model created by Nvidia that can be used for general purpose processing along with graphics processing.

The model is then optimized using a solver algorithm. The solver algorithm is a type of a stand-alone computer program or a software library that is configured to optimize the training model by computing an accuracy of the model using the training dataset. The solver algorithm computes the accuracy by iteratively using the validation set 436. For example, the solver algorithm may use the validation set 436 for every 1000 iterations in an optimization process of 40000 iterations that takes a snapshot of the trained model at every $5000^{th}$ iteration.

The GPU 210/240 then performs model training using the results of the solver algorithm. During the training process, the GPU 210/240 monitors losses and the model accuracy. In an example, Caffe takes a snapshot of loss and model accuracy of the trained model at every $5000^{th}$ iteration. Then the GPU 210/240 plots a learning curve of the losses as a function of the number of iterations as depicted in the graph 438. Multiple iterations are performed until a steady-state accuracy rate is achieved. For example, as can be seen in the graph 438 the trained model achieves an accuracy rate of about 90% that stops improving after about 3000 iterations.

Once the trained model is ready, the GPU 210/240 starts predicting accuracy of unseen images from a testing dataset downloaded from a Kaggle platform. The GPU 210/240 reads an image from the testing dataset, processes the image, and calculates a probability of accuracy, for example, 0 for orange, and 1 for apple. For example, if an accuracy rate of 98% is achieved, that image is considered to be of an apple.

In one embodiment, the model is stored in the cloud database of the cloud server 205 which is accessible by the refrigerator 225 via the network 220. In another embodiment, the model may be stored in the local memory of the refrigerator 225. The GPU 210 and/or 240 analyses an input image 420 using the model. The image 420 is compared with the features of an apple stored in the model. The GPU 210 and/or 240 generates an output 440 that identifies the food item to be an apple 245 if the comparison yields a high accuracy rate. In this example, the GPU 210 and/or 240 identifies that the input image is of an apple that is bright green in colour. The GPU 210 and/or 240 identifies the apple 245 to be a Granny Smith apple. The CPU 290 may compare historical data associated with the apple 245 stored in the local memory of the refrigerator 225 or the cloud server 205 to determine that the apple 245 is 3 days old. Hence, the CPU 290 may recommend the user to consume the apple 245 within 5-10 days. In an embodiment, the apple 245 is placed on the scale of the refrigerator 225. The scale weighs a weight of the apple 245 to be 200 grams and the same is displayed as the output 440.

Although the example discussed herein is provided with reference to using convolutional neural networks that uses the deep learning framework Caffe, C++, MATLAB, and Python programming languages, the NVIDIA GPU, the Kaggle dataset, and the Alexnet CNN architecture model, it is to be understood that the refrigerator system 200, in another embodiment, may be implemented using any other deep learning algorithm that uses any other framework, programming language, GPU, dataset, and/or architecture model. The example included herein is described with reference to the publication "A PRACTICAL INTRODUCTION TO DEEP LEARNING WITH CAFFE AND PYTHON", which is included here as a reference.

Figure 4C:
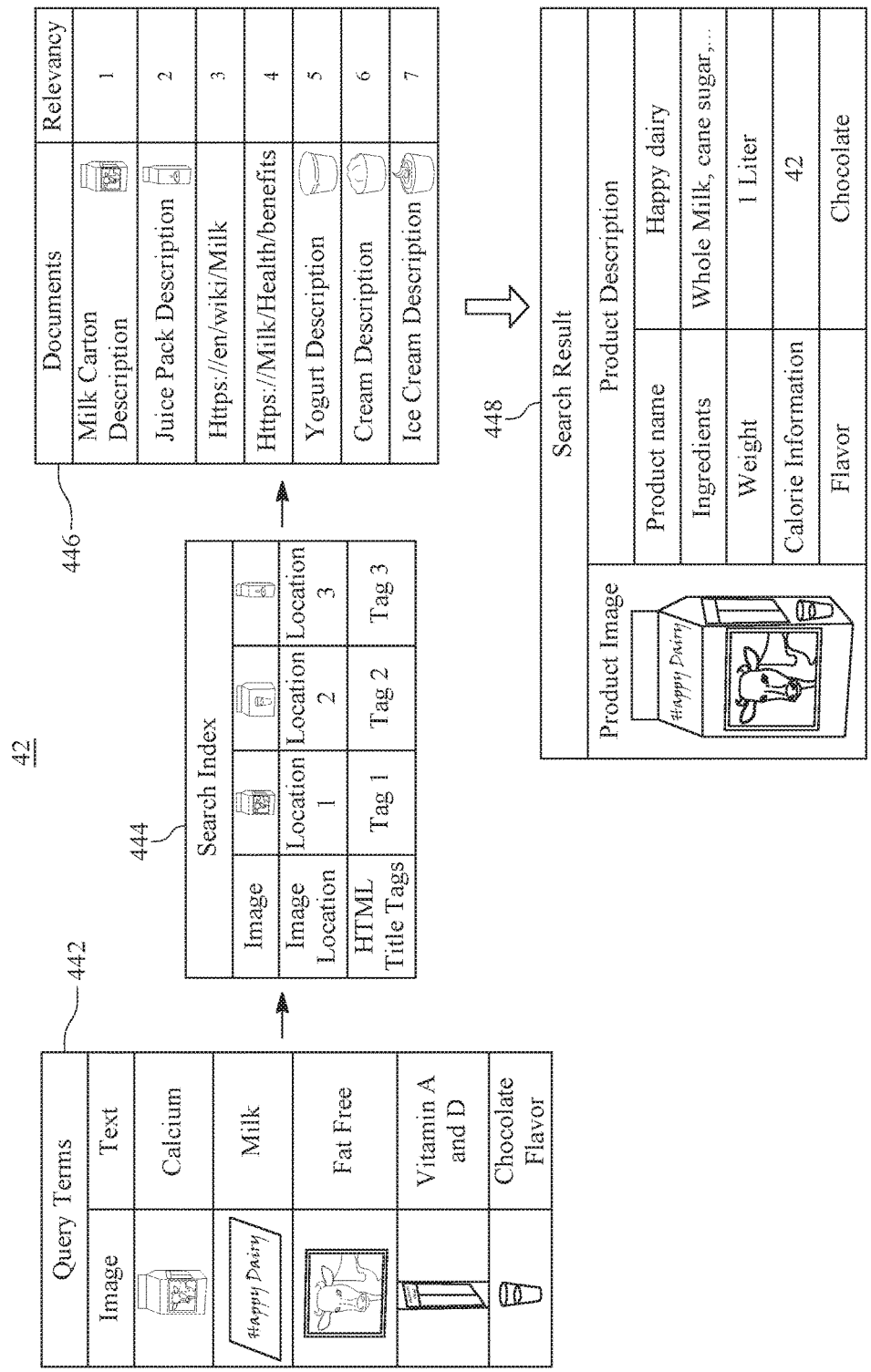
FIG. 4C demonstrates an embodiment 42 of a method for performing a visual search for recognizing the food items present in the refrigerator, in accordance with the invention as a diagram.

FIG. 4C demonstrates an embodiment 42 of a method for performing a visual search for recognizing the food items 259 present in the refrigerator 225, in accordance with the invention as a diagram.

In an example implementation, the GPU 210 or 240 and/or CPU 290 uses an image of a food item such as, a milk carton 253 captured by the camera 235, 236, 237, or 238 for performing the visual search. The GPU 210 or 240 and/or CPU 290 searches the Internet with the image of the milk carton 253. The query terms 442 used for the visual search may comprise parts of the image such as, the image of the milk carton 253, an image portion depicting a brand name of the milk carton 253, an image portion depicting a cow, an image portion depicting a glass, etc. The query terms 442 may also comprise text terms extracted from the image such as, milk, fat free, vitamin A and D, chocolate flavour, etc. The GPU 210 or 240 may identify the text terms, for example, by using OCR technique. In an embodiment, the different types of query terms 442 can be used in a mix, as described in the publication WO 2011/020742 A1, from the current inventor, which is included here as reference.

The search index 444 may be created by using the images, location of the images on the Internet, HTML title tags that indicate a title of a corresponding web page, HTML alt attributes that indicate an alternative text to be displayed when the image is not rendered, etc. In an embodiment, the search index 444 may be a proprietary database of search indices stored in the cloud server 205. In another embodiment, the search index 444 may be created using historical data associated with previous searches conducted on the food items 259 contained in the refrigerator 225. For example, the CPU 290 may create a search index based on search conducted on images of the food items 259 of the refrigerator taken 3 days ago. In this embodiment, the search index 444 may be stored in the local memory unit of the refrigerator 225. In yet another embodiment, the search index 444 may be a proprietary search database that accessed by the GPU 210 or 240 and/or CPU 290 via the Internet.

The GPU 210 or 240 and/or CPU 290 compares the query terms 442 with the search index 444 to identify matching images or text with a high relevancy probability. The relevancy may be determined based on, for example, freshness of an image, a region associated with the query image, PageRank result that is an algorithm used to rank websites relevant to the query image, etc. The GPU 210 or 240 and/or CPU 290 retrieve and rank the images and/or text documents 446 from the Internet or any search database based on the relevancy. The GPU 210 or 240 and/or CPU 290 determine the most relevant result and display the image and product information with the highest relevancy probability as the search result 448 for the milk carton 253. Information pertaining to the milk carton 253 is also displayed such as, ingredient information, weight, calorie information, product name, etc. In an embodiment, the milk carton 253 may be placed on an in-built scale of the refrigerator 225 for weighing weight of the milk carton 253. The determined weight, for example, 1 liter is displayed in the search result 448. In an embodiment, the CPU 290 may compare historical data associated with the milk carton 253 stored in the local memory of the refrigerator 225 or the cloud server 205. Based on the comparison, the CPU 290 determines that the milk carton 253 was placed in the refrigerator 225 two days ago and needs to be consumed within 3 days. Hence, the CPU 290 may recommend the user to consume the milk carton 253 within 2-3 days.

In an embodiment, the CPU 290 may use the ingredient information, the product name, the parts of the image, etc., as query terms 442 to search for recipes that may be prepared using the identified food item, i.e. the milk carton 253. For example, "whole milk" and "chocolate flavour" from the derived product information may be used as query terms. The query terms are compared with the search index to generate a list of relevant search results. The CPU 290 analyse the results to retrieve the most relevant recipe recommendations (not shown) using the milk product 253 such as, chocolate milk shake recipe, yogurt recipe, chocolate ice cream recipe, etc.

Any features of embodiment 40, 41, and/or 42 may be readily combined or permuted with any of the other embodiments 10, 20, 21, 30, 50, 60, 70, 80, 81, 90, 91, 92, 93, and/or 94 in accordance with the invention.

Figure 5:
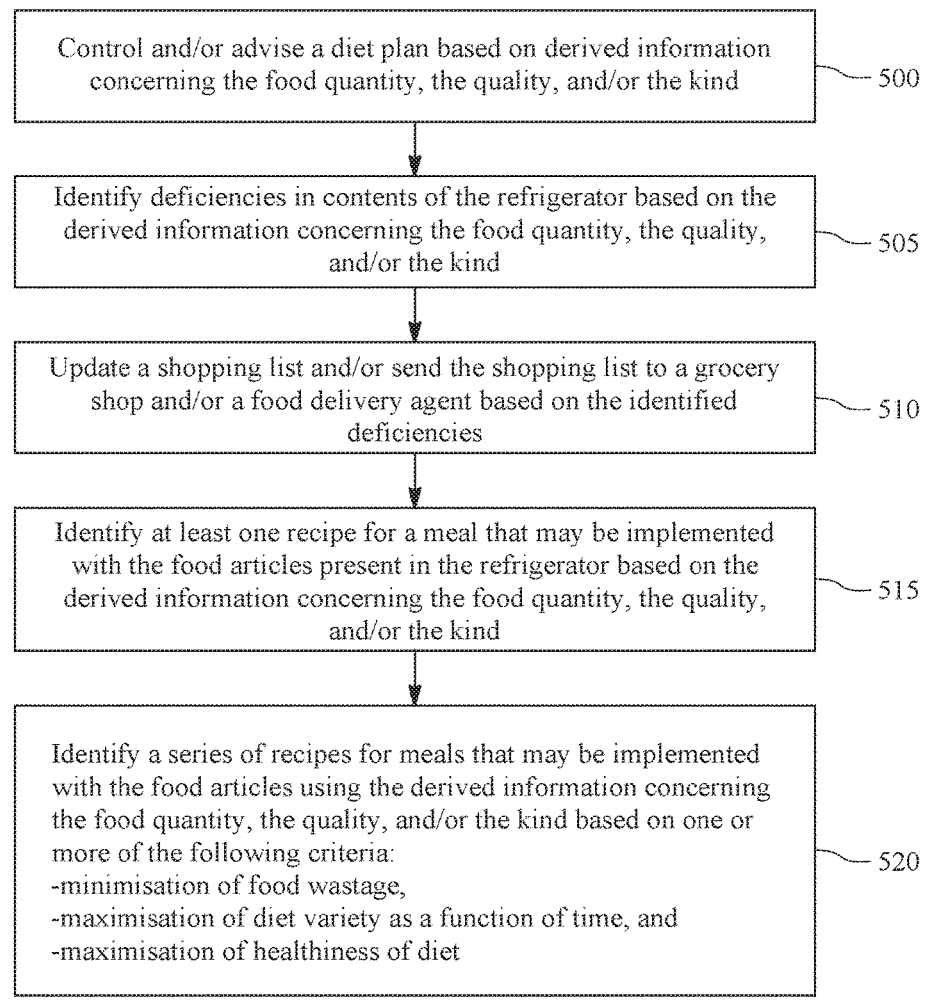
FIG. 5 demonstrates an embodiment 50 of a more elaborate method for using the identified food articles and/or the food packages in controlling and adjusting the diet of the human and/or the mammal, in accordance with the invention as a flow diagram.

FIG. 5 demonstrates another embodiment 50 of a more elaborate method for using the identified food items 259 in controlling and adjusting the diet of the user, in accordance with the invention as a flow diagram. The method could be implemented in a system identical or similar to embodiment 20, 60, and 70 in FIG. 2A, FIG. 6, and FIG. 7 for example. The end-user of the method could use a user interface identical or similar to that disclosed with embodiment 21, 30, 80, 81, 90, 92, and 94 in FIG. 2B, FIG. 3, FIG. 8A, FIG. 8B, FIG. 9, FIG. 10B, and FIG. 11B.

In phase 500, the information derived from the analysis of the images concerning the food quantity, the quality, and/or the kind is used in controlling and/or advising on the diet of the user. For example, the GPU 210 or 240 and/or the CPU 290 determine that a 100 gm pack of peanut butter 255 has 588 calories and a 100 gm pack of mayonnaise 254 has 680 calories from the analysis. The CPU 290 recommends the user to have peanut butter spread 255 for a sandwich for breakfast against the user's stored preference for mayonnaise 254 in the sandwich.

In phase 505, the derived information concerning the food quantity, quality and/or kind is used in identifying deficiencies in the contents of the refrigerator 225. The identified deficiencies are used in updating a shopping list in phase 510. The shopping list may be directly sent to a food delivery agent, for example, a grocery shop that provides home delivery. The details of the food delivery agent such as, name, store location, contact information, web page, etc., are stored in the memory of the refrigerator 225 or in the cloud server 205. For example, the derived information suggests that quantity of milk 253 has reduced to 100 ml as opposed to 1 liter quantity as pre-stored in the memory unit of the refrigerator 225. The CPU 290 updates the shopping list with 1 liter of milk 253. The user may select the option of 1 liter milk 253 via the user interface 315 on the display screen 260 of the refrigerator 225 or via the user interface on the user terminal device 215. In an example, the user interface 315 is a user interface of the application 263.

The user proceeds to payment for the food items 259 present in the shopping list via a payment gateway. The user enters credit card details to complete the payment. Alternately, the application 263 installed on the user terminal device 215 stores the user's credit card details and uses the stored credit card details to complete the payment. The grocery shop receives the payment. Once the payment is successful, the CPU 290 sends the shopping list to a server of the grocery shop that arranges for the home delivery at the user's preferred time. The grocery shop server acquires and packages the food items 259 mentioned in the shopping list. In an example, the food items 259 are collected and packaged manually by a grocery shop personnel. In another example, the food items 259 are prepared for delivery by a robot programmed to scan the shopping list, collect the food items 259 from respective aisles of the grocery shop, and package the food items 259 for delivery. The food delivery agent delivers the food items 259 to the user's address along with a printed receipt. The user can scan the printed receipt via the application 263 installed on the user terminal device 215 and send the printed receipt to the refrigerator 225. The printed receipt is stored in the memory unit of the refrigerator 225.

Once the refrigerator 225 is replenished with the delivered food items 259, the camera 235, 236, 237, or 238 captures an image of an inside of the refrigerator 225. The GPU 210 or 240 compares the captured image with a previous image of the refrigerator 225 taken before the replenishment. The GPU 210 or 240 and/or CPU 290 verify whether the food items 259 mentioned in the receipt are present in the refrigerator 225. In an example implementation, the CPU 290 may compare the receipt with the shopping list to verify whether the food items 259 mentioned in the shopping list are delivered to the user, and/or whether any food item 259 mentioned in the shopping list is missing from the receipt.

If the CPU 290 determines that any food item 259 mentioned in the receipt is missing from the refrigerator 225 or any food item 259 mentioned in the shopping list is not present in the receipt, the CPU 290 sends an alert notification to the user terminal device 215. The CPU 290 may also display the alert notification on the display screen 260.

If the CPU 290 determines that an additional food item 259 that is not mentioned in the receipt is present in the refrigerator 225 or any additional food item 259 that is not mentioned in the shopping list but is mentioned in the receipt, the CPU 290 displays an alert notification to the user terminal device 215 and/or on the display screen 260 notifying the user of a possible wrong delivery of the food items 259.

In addition to an alert, it is in accordance with the invention for the refrigerator system to take corrective actions, which may be any of the following: Notification to the grocer of the delivery of an unordered item, re-ordering a missing item from the grocer, request for reimbursement of payment for a missing item from the grocer, a further payment for an item mentioned on the shopping list, but absent from the payment receipt.

In phase 515, the derived information concerning the food quantity, quality and/or kind is used in identifying at least one recipe(s) for a meal that could be implemented with the food. For example, the GPU 210 or 240 identifies that 500 gm of salmon fish fillets 258 expiring in 2 days are present in the refrigerator 225. Based upon this information, the CPU 290 recommends the user to prepare smoked salmon for dinner and also provide a recipe for the same.

In phase 520, a series of recipes for meals are identified that could be implemented with the food based upon, for example, minimisation of food wastage, maximisation of diet variety as a function of time, and maximisation of the healthiness of diet. For example, if the GPU 210 or 240 determines that chicken 252 in the refrigerator 225 may expire in 2 days, the CPU 290 may suggest preparing chicken curry for dinner thereby minimising food wastage. In another example, if the GPU 210 or 240 determines that various food items 259 such as chicken 252, broccoli 248, carrots 249, fish 258, potatoes, bread 246, burger buns, and eggs 247 are present in the refrigerator 225, the CPU 290 prepares a diet plan for the user using the aforementioned ingredients. The diet plan may include for example, for Monday bread with eggs for breakfast, chicken curry with rice for lunch, and fish fillets with egg salad for dinner, for Tuesday beetroot salad for breakfast, egg salad with vegetables for lunch, and fish fry with rice for dinner, and so on. Hence, the CPU 290 recommends a diet plan that is healthy and provides diet variety to the user. In another example, if the GPU 210 or 240 identifies that French dressing 257 and mayonnaise 254 are present in the refrigerator 225, the CPU 290 may suggest to use French dressing 257 as a salad dressing over mayonnaise 254 to ensure lesser calorie intake if it is known that the French dressing 257 has a smaller calorie content per weight or volume unit. Further, as and when the GPU 210 or 240 recognizes by analysing the captured images that the user is following the recommended recipe by removing suggested ingredients from the refrigerator 225, the CPU 290 simultaneously updates the shopping list. For example, on Monday morning the GPU 210 or 240 recognizes that quantity of bread 246 and eggs 247 has reduced and the CPU 290 updates the shopping list with bread and eggs, thereby ensuring that bread and eggs are available for next meal preparation.

Any features of embodiment 50 may be readily combined or permuted with any of the other embodiments 10, 20, 21, 30, 40, 41, 42, 60, 70, 80, 81, 90, 91, 92, 93, and/or 94 in accordance with the invention.

Figure 6:
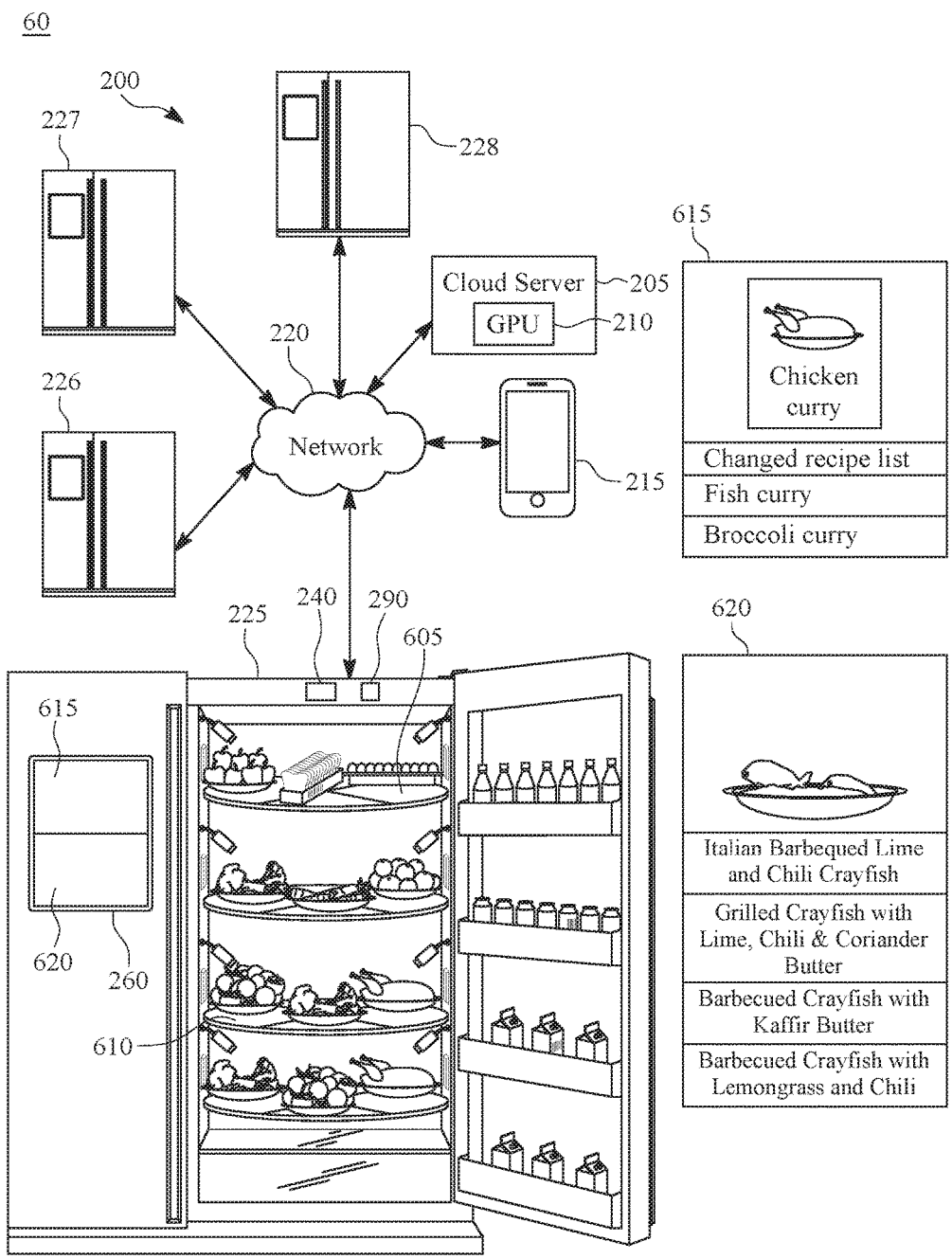
FIG. 6 demonstrates an embodiment 60 of a more elaborate refrigerator system for identifying the food articles and/or the food packages present in the refrigerator, in accordance with the invention as a block diagram.

FIG. 6 demonstrates another embodiment 60 of a more elaborate refrigerator system 200 for identifying the food items 259 present in the refrigerator 225, in accordance with the invention as a block diagram.

The cameras 235, 236, 237, and/or 238 capture images of the food items 259. In an embodiment, the GPU 210 or 240 recognizes the food items 259 by using deep learning algorithms as explained in the detailed description of FIG. 4B. In another embodiment, the GPU 210 or 240 performs a visual search on the captured image as explained in the detailed description of FIG. 4C. Preferably the GPU 210 or 240 may employ both deep learning techniques and the visual search technique to recognize the food items 259. Most preferably the GPU 210 or 240 may employ the deep learning technique as a primary method and the visual search technique as a secondary method for recognizing the food items 259. In an embodiment, the cloud GPU 210 is configured to receive images from multiple refrigerators 225, 226, 227, and/or 228, and the cloud GPU 210 performs a visual search on the images received from multiple refrigerators 225, 226, 227, and/or 228, thereby providing a maximised and a processing efficient GPU usage and reduced memory requirement per refrigerator 225, 226, 227, and/or 228.

In some embodiments, the visual search may comprise optical identification of OCR codes, RFID tags, or bar codes on the food packages such as milk cartons 253, juice packs 256, etc. For example, the GPU 210 or 240 scans a bar code on a food package such as a milk carton 253, to identify a best before date, nutritional information, quantity of milk, etc. In another embodiment, the GPU 210 or 240 identifies a text in the image, for example, an expiry date, calorie information, etc., printed on the food package such as a bread packet 246. The GPU 210 or 240 identifies the text by scanning or using OCR technique. In an example, the GPU 210 or 240 scans textual information on a bread packet 246 to identify a best before date, a net weight, nutritional information, a price, etc. In an example implementation, the CPU 290 compiles a list of recipes for meals as a function of time based on the recognised best before dates. If the user implements the list of recipes suggested by the CPU 290 and consumes a maximum amount of food before the best before dates, then no or minimal food wastage may be ensured.

In an example, the GPU 210 or 240 may identify cost of a food item by scanning textual information printed on a package of the food item such as, salmon fish 258. In an embodiment, the GPU 210 or 240 and/or CPU 290 is programmed to recommend expensive food items (for example, the salmon fish 258) to be consumed before the expiry date in order to avoid wastage of expensive food items.

Consider an example where the cameras 235, 236, 237, 238 capture images of the food items 259 of the refrigerator 225. The food items 259 may comprise apples 245, bread 246, eggs 247, broccoli 248, carrots 249, tomatoes 250, chicken 252, milk 253, mayonnaise 254, etc. The GPU 210 or 240 scans textual information on packages of bread 246, eggs 247, milk 253, and mayonnaise 254 to identify that 1 packet of bread 246, 12 eggs 247, 2 liters of toned milk 253, and 200 grams of mayonnaise 254 is present in the refrigerator 225.

In an embodiment, the refrigerator 225 has a scale 605 on a surface of the refrigerator 225. The scale 605 is used to weigh the food items 259. The scale 605 may be, for example, a digital scale or an analog scale. In an example implementation, the scale 605 is built-in in each shelf of the refrigerator 225 such that any food item 259 placed in the shelf may be weighed simultaneously. The measured weight may be displayed to the user via the user interface 305 on the display screen 260 of the refrigerator 225. Hence, the user can view on the user interface 305 when quantity of milk 253, oranges 251, butter 255, etc., has reduced and may order the same to replenish the reduced quantity.

In an embodiment, the refrigerator 225 comprises a trolley device 610 for mechanically moving food inside the refrigerator 225. For example, a Lazy Susan trolley may be used to mechanically move food items 259 from the back of the refrigerator 225 shelf to the front. In one embodiment the trolley device 610 may be manually spun around to pick a desired food item 259 from the shelf. In an embodiment, the trolley device 610 may be programmed to function with respect to the diet plan created by the CPU 290. For example, if the diet plan for Monday's breakfast is bread 246 and butter 255, then the trolley device 610 is pre-programmed to rotate and position the bread 246 and butter 255 in the front of the respective shelf at about 8 am on a Monday morning.

In an embodiment, the GPU 210 or 240 and/or CPU 290 may receive from the user terminal device 215 an image of a meal, a food article, or a food package that the user has consumed or is about to consume. The GPU 210 or 240 analyses the image to determine a quality, a quantity, or a kind of food depicted in the image, for example, by using a deep learning algorithm as explained in the detailed description of FIG. 4B. The CPU 290 uses the derived information of the depicted food to change a recipe list based on the food items 259 present in the refrigerator 225. The changed recipe list is sent to the user terminal device 215 via the network 220. For example, the GPU 210 or 240 and/or CPU 290 receive the image of a chicken curry from the user terminal device 215 as displayed in the user interface 615. The CPU 290 checks the stored diet plan for the user. As per the diet plan, the user is advised to have chicken curry for dinner the same day. The CPU 290 changes the recipe list to include fish curry and broccoli curry instead. The user may click on the fish curry or the broccoli curry to retrieve recipe information.

In an embodiment, the GPU 210 or 240 receives deep learning data files from the cloud server 205. The deep learning data files facilitate recognition of a food item 259 by the GPU 210 or 240 from an image of the food item 259. For example, the GPU 210 or 240 may access a deep learning data file/training model associated with a fish curry stored in the cloud server 205. The user terminal device 215 sends an image of a particular fish curry to the refrigerator system 200. The GPU 210 or 240 compares the image with the deep learning data file/training model. The GPU 210 or 240 recognizes the image to be of a barbequed lime and chili crayfish recipe based on the analysis performed using the deep learning algorithm. The CPU 290 may search the Internet for different barbequed lime and chili crayfish recipes using a text query term or an image query term as explained in the detailed description of FIG. 4C. Based on the search results different barbequed lime and chili crayfish recipe options, for example, Italian barbequed lime and chili crayfish, grilled crayfish with lime, chilli, and coriander butter, etc., are provided to the user via the user interface 620. The user may click on any option to access corresponding recipe information of the barbequed lime and chili crayfish.

Any features of embodiment 60 may be readily combined or permuted with any of the other embodiments 10, 20, 21, 30, 40, 41, 42, 50, 70, 80, 81, 90, 91, 92, 93, and/or 94 in accordance with the invention.

Figure 7:
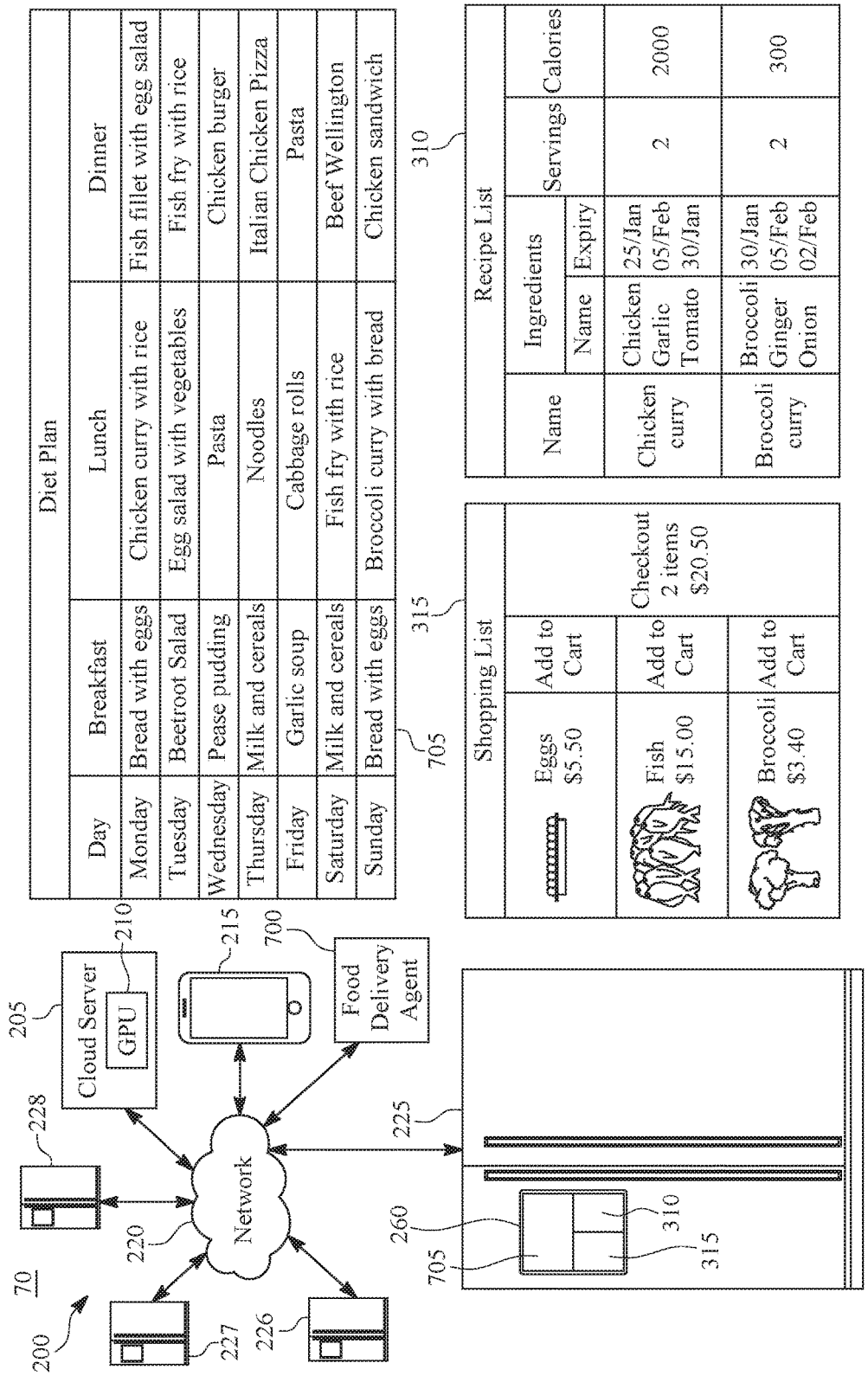
FIG. 7 demonstrates an embodiment 70 of a more elaborate refrigerator system for using the identified food articles and/or the food packages in controlling and adjusting the diet of the human and/or the mammal, in accordance with the invention as a block diagram.

FIG. 7 demonstrates another embodiment 70 of a more elaborate refrigerator system 200 for using the identified food items 259 in controlling and adjusting a diet of a consumer, in accordance with the invention as a block diagram.

In an embodiment, the CPU 290 uses the information derived from the analysis of the images concerning the food quantity, the quality, and/or the kind to control and/or advise the diet of the user. In some embodiments, the cloud GPU 210 is configured to receive images from multiple refrigerators 225, 226, 227, and/or 228, and use the information derived from the analysis of the images concerning the food quantity, the quality, and/or the kind to control and/or advise the diet of the user. Hence, there is no need for every refrigerator 225, 226, 227, and/or 228 to have an individual GPU 240. By sharing a GPU 210 in the cloud, the use of the GPU 210 is maximised and there is only a fractional cost of the GPU 210 to distribute to each refrigerator 225, 226, 227, and/or 228.

The CPU 290 generates a diet plan for the user as depicted in the user interface 705. In an example, the diet plan is generated based on expiration dates, quantity, quality, etc., of the food items 259 present in the refrigerator 225 for the week. In an example, the GPU 210 or 240 determines that 1 kg of broccoli 248 expiring in 3 days, 2 packets of whole wheat bread 246 expiring in 7 days, 1 kg of chicken 252 expiring in 2 days, 1 kg of frozen fish 258 expiring in 5 days, 500 gm of spinach expiring in 5 days, 500 gm of carrots 249 expiring in 5 days, 1 kg of French beans expiring in 3 days, 2 dozen eggs 247 expiring in 10 days, 2 l of milk 253 expiring in 5 days, 500 ml of cream expiring in 15 days, 500 gm of butter 255 expiring in 30 days, 250 ml of curd expiring in 7 days, 500 gm of beetroot expiring in 5 days, etc., are present in the refrigerator 225. The CPU 290 uses the information associated with the quantity and the quality of the food articles to create the diet plan for the user. For example, the diet plan may suggest breakfast options as bread with eggs on Monday, beetroot salad on Tuesday, Peas' pudding on Wednesday, and so on, as illustrated in the user interface 705. Similarly, the CPU 290 determines the entire week's lunch and dinner meal options for the user using the quantity and expiry date information of the food items 259 present in the refrigerator 225, thereby ensuring minimisation of food wastage, maximisation of diet variety as a function of time, and maximisation of the healthiness of diet. The diet plan created by the CPU 290 is illustrated in the user interface 705.

In an embodiment, the CPU 290 uses the derived information concerning the food quantity, the quality and/or the kind in identifying deficiencies in the contents of the refrigerator 225. The CPU 290 updates a shopping list based on the identified deficiencies. The CPU 290 may send the shopping list to a grocery shop and/or a food delivery agent 700. For example, the CPU 290 identifies that eggs 247, fish 258, and broccoli 248 need to be replenished. The user may select the items and corresponding quantities, pay for the purchase, and the CPU 290 sends the order to the grocery store.

In an embodiment, the CPU 290 uses the derived information concerning the food quantity, the quality, and/or the kind to identify at least one recipe for a meal that may be implemented with the food items 259 of the refrigerator 225. In an embodiment, the CPU 290 uses the derived information concerning the food quantity, the quality, and/or the kind to identify a series of recipes for meals that may be implemented with the food items 259 based upon one or more of criteria comprising minimisation of waste of food, maximisation of diet variety as a function of time, and/or maximisation of the healthiness of diet. For example, as illustrated in the user interface 310 the CPU 290 suggests recipes considering the expiry dates of the ingredients. The diet plan displayed in the user interface 705 ensures maximisation of diet variety as a function of time and maximisation of the healthiness of diet.

Any features of embodiment 70 may be readily combined or permuted with any of the other embodiments 10, 20, 21, 30, 40, 41, 42, 50, 60, 80, 81, 90, 91, 92, 93, and/or 94 in accordance with the invention.

FIG. 8A demonstrates an embodiment 80 of a software program product user interface 305 or 615 or showing food identification in accordance with the invention as a screen shot diagram. This could be for example a display screen 260 on a front door of the refrigerator 225. In another example not depicted in FIG. 8A, the software program product user interface 305 or 615 may be the screen 261 of a tablet or a smartphone. The refrigerator system 200 behind the user interface 305 or 615 could be e.g. embodiment 20, 60, and 70 explained with respect to FIG. 2A, FIG. 6, and FIG. 7.

The cameras 235, 236, 237, and/or 238 capture images of the food items 259. In an embodiment, the GPU 210/240 uses deep learning data files to recognize a quality, a quantity, or a kind of the food items 259 present in the refrigerator 225, as explained in the detailed description of FIG. 4B. The GPU 210 or 240 uses the deep learning files received from the cloud server 205 to recognize the food items 259. For example, the GPU 210 or 240 compares an image of an apple 245 with the deep learning data files. Based on the analysis, the GPU 210 or 240 determines that the apple 245 is a fresh Lobo apple that may last up to 7 days in the refrigerator 225.

In another embodiment, the GPU 210 or 240 analyses and conducts a visual search to identify the food items 259. In an embodiment, the visual search may comprise optical identification and/or searching based on textual information as explained earlier in the detailed description of FIG. 4C. In an example implementation, the GPU 210 or 240 may identify the food items 259 using OCR codes, RFID tags, bar codes, etc. In an example implementation, the OCR codes on the food packages such as milk cartons 253 are processed and identified from the captured images. The GPU 210 or 240 identifies the best before dates by reading the OCR on the milk package 253. The derived information such as, a food name, an expiry date, a quantity, calorie information, etc., is depicted in the user interface 305.

In another example implementation, the GPU 210 or 240 identifies textual information printed on a milk package 253. The CPU 290 uses the textual information such as whole wheat bread as a query text term. The CPU 290 searches the Internet with the query text term and generates a search index comprising search results derived from the Internet. The search results may comprise, for example, different kinds of whole wheat breads, bread types with whole wheat bread synonyms such as whole grain bread or wholemeal bread, whole wheat breads sold by different bread brands, bread types based on a region, etc. The CPU 290 compares the query text term with the search index to retrieve a most relevant result based on the comparison. The CPU 290 may retrieve a bread name, quantity, nutritional information, etc., associated with the bread type with the highest relevancy probability amongst the search results.

In an embodiment, the scale 605 electronically or electrically coupled with the CPU 290 weighs each food item 259 placed in the refrigerator 225. The CPU 290 displays the measured weight along with other food item details in the user interface 305. In an example implementation, the user may judge by the displayed weight whether a particular food item 259 needs to be replenished. In another example implementation, the CPU 290 identifies a decrease in the quantity of the food items 259 based on the weight and updates the shopping list with the food items 259 that need to be replenished.

In an embodiment, the GPU 210 or 240 receives images of meals, food items 259 from the user terminal device 215. The GPU 210 or 240 analyses the received image to identify the food quantity, quality, or kind from the image to compute a changed recipe list. For example, the user captures an Instagram image of a lunch meal comprising an Italian chicken pizza. The user's Instagram account is integrated with the refrigerator system 200 such that the Instagram image is transmitted to the refrigerator 225 in real time via the network 220. The Instagram image is displayed in the user interface 615. The GPU 210 or 240 analyses the image and determines that the user had Italian chicken pizza for lunch. The diet plan determined by the CPU 290 had pizza with French fries recommended for dinner, so the CPU 290 changes the meal options to beetroot salad with French fries, egg salad with fish fillets, or broccoli roast with vegetable salad for dinner instead, so that the user's diet is not too monotonic. The CPU 290 updates the recipe list and the diet plan for the user. The changed recipe list is displayed to the user via the user interface 615. The CPU 290 sends the updated recipe list to the user terminal device 215 via the network 220.

Any features of embodiment 80 may be readily combined or permuted with any of the other embodiments 10, 20, 21, 30, 40, 41, 42, 50, 60, 70, 81, 90, 91, 92, 93, and/or 94 in accordance with the invention.

Figure 8B:
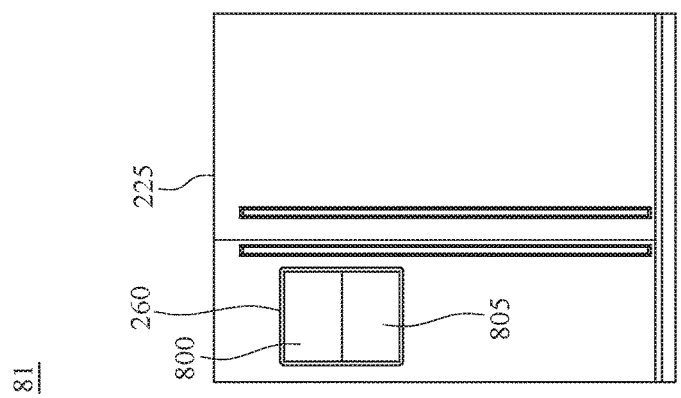
FIG. 8B demonstrates an embodiment 81 of a software program product user interface showing a diet plan in accordance with the invention as a screen shot diagram.

FIG. 8B demonstrates an embodiment 81 of a software program product user interface 800 or 805 showing a diet plan, in accordance with the invention as a screen shot diagram. This could be for example a display screen 260 on a front door of the refrigerator 225. In another example, the software program product user interface 800 or 805 may be the screen 261 of a tablet or a smartphone. The refrigerator system 200 behind the user interface 800 or 805 could be e.g. embodiment 20, 60, and 70 explained with respect to FIG. 2A, FIG. 6, and FIG. 7.

The GPU 210 or 240 analyses images of the food items 259 captured by the cameras 235, 236, 237, and 238 of the refrigerator 225. Based on the analysis, the GPU 210 or 240 and/or CPU 290 determines and displays information such as, food name, nutritional information, and quantity of the food items 259 via the user interface 800. In an embodiment, the user may input personal information such as, an age, weight, height, gender, a type of job, residence information, etc., and food preferences such as a sweet dish after dinner, salads for lunch, a hot beverage for breakfast, high protein meals, etc. The CPU 290 uses the personal information and the food preferences along with the derived nutritional information of the food items 259 to generate a diet plan for the user. For example, the CPU 290 may use the personal information to calculate a body mass index, an ideal weight, a current weight status, ideal calorie intake to maintain an ideal weight or to reach a desired weight in a given time, etc., for the user. The CPU 290 may use the calculated information to prepare the diet plan such that the user may maintain an ideal weight suiting the user's age and gender.

In an example, if the CPU 290 determines that the user's food preferences do not allow a healthy diet for the user, the CPU 290 may alter the diet plan. For example, if the diet plan based on the user preferences suggests egg salad with milk for breakfast and salmon pizza for lunch, the CPU 290 determines that the user's diet for the day has excess of proteins. Hence, the CPU 290 adds vegetable pasta to dinner to balance vitamins and carbohydrates in the day's diet plan. The changed diet plan is illustrated in the user interface 805. In an example implementation, the user may input personal information and food preferences of family members or guests such that the CPU 290 may recommend a diet plan for each family member or recipe options for preparing meals for guests.

Any features of embodiment 81 may be readily combined or permuted with any of the other embodiments 10, 20, 21, 30, 40, 41, 42, 50, 60, 70, 80, 90, 91, 92, 93, and/or 94 in accordance with the invention.

Figure 9:
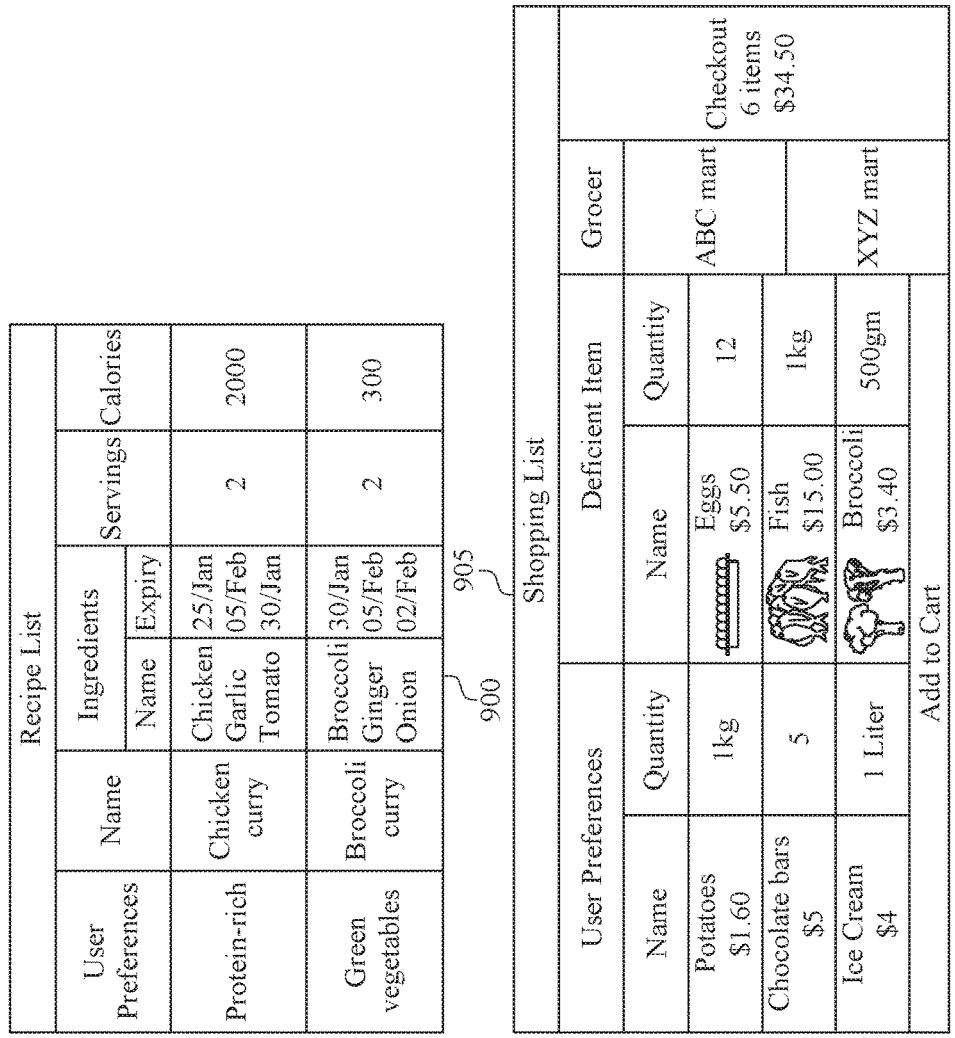
FIG. 9 demonstrates an embodiment 90 of a software program product user interface showing use of the food identification information in controlling and adjusting the diet of the human and/or the mammal, in accordance with the invention as a screen shot diagram.

FIG. 9 demonstrates an embodiment 90 of a software program product user interface 900, 905, or 705 showing use of the food identification information in controlling and adjusting the diet of the user, in accordance with the invention as a screen shot diagram. This could be for example a display screen 260 on a front door of the refrigerator 225. In another example, the software program product user interface 900, 905, or 705 may be the screen 261 of a tablet or a smartphone. The refrigerator system 200 behind the user interface 900, 905, or 705 could be e.g. embodiment 20, 60, and 70 explained with respect to FIG. 2A, FIG. 6, and FIG. 7.

In an embodiment, the CPU 290 uses the derived information concerning the food quantity, quality, and/or kind in identifying deficiencies in the contents of the refrigerator 225. The identified deficiencies are used in updating a shopping list and/or the shopping list is sent to a grocery shop and/or food delivery agent 700. The CPU 290 identifies deficiencies in the food items 259 as and when food is consumed from the refrigerator 225. The CPU 290 dynamically updates the deficient food articles in the user interface 905. The user may select a food item 259 to be replenished from a list of the food items 259 updated by the CPU 290 via the user interface 905. In an embodiment, the CPU 290 update the shopping list based on user preferences obtained from the user apart from the deficient food items 259 identified by the GPU 210 or 240. For example, the user may be prompted to input any food item 259 of choice such as, potatoes, chocolate bars, ice cream, etc., via the user interface 905. In an embodiment, the user may input a quantity of the food item 259, a grocer from whom the user wishes to purchase the food items 259, or view prices of the food items 259, etc., via the user interface 905.

In an embodiment, the CPU 290 uses the derived information concerning the food quantity, quality, and/or kind in identifying at least one recipe(s) for a meal that could be implemented with the food. For example, the GPU 210 or 240 determines that broccoli 248, radish, carrots 249, beetroot, onions, etc., are present in the refrigerator 225. The CPU 290 may suggest a broccoli curry recipe that can be prepared by using the abovementioned ingredients. The user may click on the broccoli curry icon via the user interface 900 to access the recipe details. In an embodiment, the CPU 290 may obtain user preferences via the user interface 900 to recommend recipes also based on the derived information for user input. For example, the user may input a preference of having a protein-rich meal or a meal rich in green vegetables. The CPU 290 considers the preferences and suggests chicken curry as the protein-rich meal and broccoli curry as the vegetable recipe.

Any features of embodiment 90 may be readily combined or permuted with any of the other embodiments 10, 20, 21, 30, 40, 41, 42, 50, 60, 70, 80, 81, 91, 92, 93, and/or 94 in accordance with the invention.

Figure 10A:
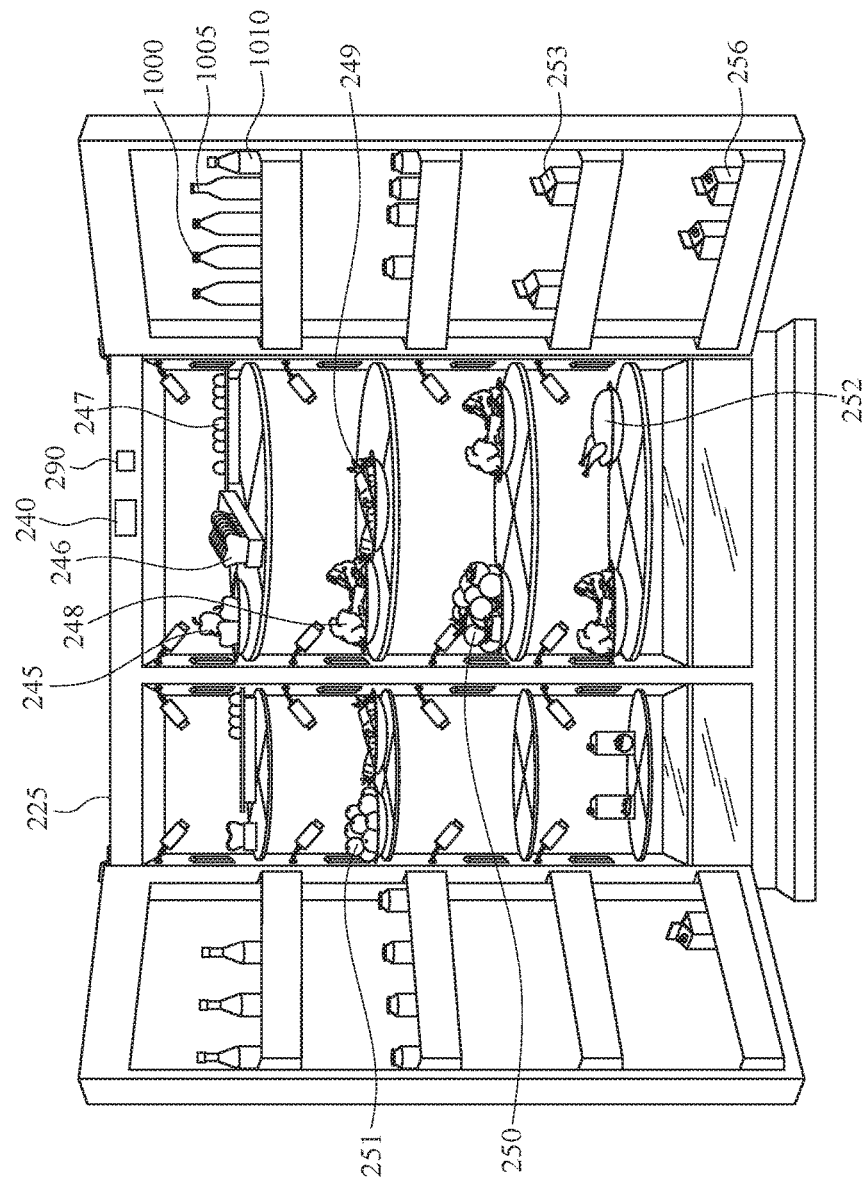
FIG. 10A demonstrates an embodiment 91 of the refrigerator showing food items contained therein, in accordance with the invention as a diagram.

FIG. 10A demonstrates an embodiment 91 of the refrigerator 225 showing food items 259 contained therein, in accordance with the invention as a diagram. The user may store a week's groceries in the refrigerator 225 at the start of the week, for example, on Sunday. The cameras 235, 236, 237, and/or 238 of the refrigerator 225 capture images of the food items 259 placed inside the refrigerator 225. In an example implementation, the images are captured every time the refrigerator doors are closed. The GPU 210 or 240 analyses the images to determine a quality, a quantity, and/or a kind of the food items 259 present in the refrigerator 225. In an example, FIG. 10A depicts grocery items remaining in the refrigerator 225 midway through the week, for example, on Wednesday. The remaining grocery items include, for example, bread 246, eggs 247, tomatoes 250, carrots 249, broccoli 248, oranges 251, juice boxes 256, apple 245, chicken 252, milk cartons 253, water bottles 1000, beverages 1005, ketchup 1010, etc.

Figure 10B:
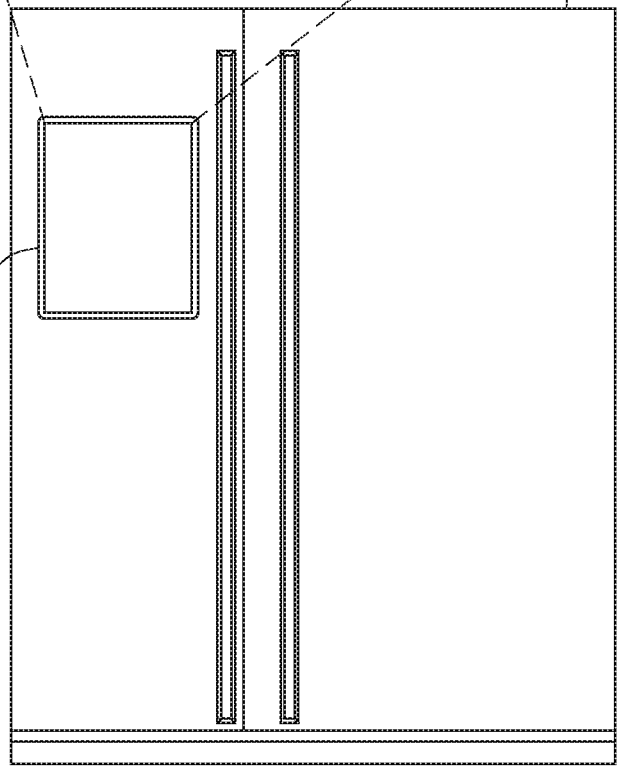
FIG. 10B demonstrates an embodiment 92 of a software program product user interface showing a derived shopping list to address deficiencies in the food items of the refrigerator, in accordance with the invention as a screen shot diagram.

FIG. 10B demonstrates an embodiment 92 of a software program product user interface 315 showing a derived shopping list to address deficiencies in the food items 259 of the refrigerator 225, in accordance with the invention as a screen shot diagram. This could be for example a display screen 260 on a front door of the refrigerator 225. In another example not depicted in FIG. 10B, the software program product user interface 315 may be the screen 261 of a tablet or a smartphone. The refrigerator system 200 behind the user interface 315 could be e.g. embodiment 20, 60, and 70 explained with respect to FIG. 2A, FIG. 6, and FIG. 7.

In this example, the GPU 210 or 240 receives images of the food items 259 as present in the refrigerator 225 on Wednesday. The GPU 210 or 240 analyses the images to identify the quantity, the quality, and/or the kind of food available in the refrigerator 225 on Wednesday. The CPU 290 determines deficient food items 259. In an example implementation, the GPU 210 or 240 and/or CPU 290 compares the image of the inside of the refrigerator 225 captured on Sunday with the image captured on Wednesday and determines the deficiency in the food items 259. For example, the GPU 210 or 240 and/or CPU 290 determines that since Sunday 1 kg of fish 258, 500 gm of chicken 252, 250 gm of carrots 249, 2 cartons of milk 253, etc., have been consumed by the user. The CPU 290 updates the shopping list to include information of the deficient food items 259. For example, the shopping list is updated to include 1 kg of fish, 250 gm of broccoli, and 2 dozen eggs. The updated shopping list is displayed in the user interface 315 as illustrated in FIG. 10B. In an embodiment, the shopping list user interface 315 is configured as an online ordering user interface where the user may add the deficient food items 259 to an online cart. Once the user makes payment through the user interface 315 integrated with an online payment gateway, the CPU 290 sends the shopping list information to the food delivery agent 700 or to a grocery shop. Preferably the shopping list is communicated electronically, but it can also be printed e.g. on paper and provided physically to a grocer in some embodiments of the invention. Hence, the invention ensures a hassle-free shopping experience to the user by avoiding confusing grocery aisles, wasting time in long billing queues at shopping marts, or saving transit time for delivery of the grocery items.

Any features of embodiments 91 and/or 92 may be readily combined or permuted with any of the other embodiments 10, 20, 21, 30, 40, 41, 42, 50, 60, 70, 80, 81, 90, 93, and/or 94 in accordance with the invention.

Figure 11A:
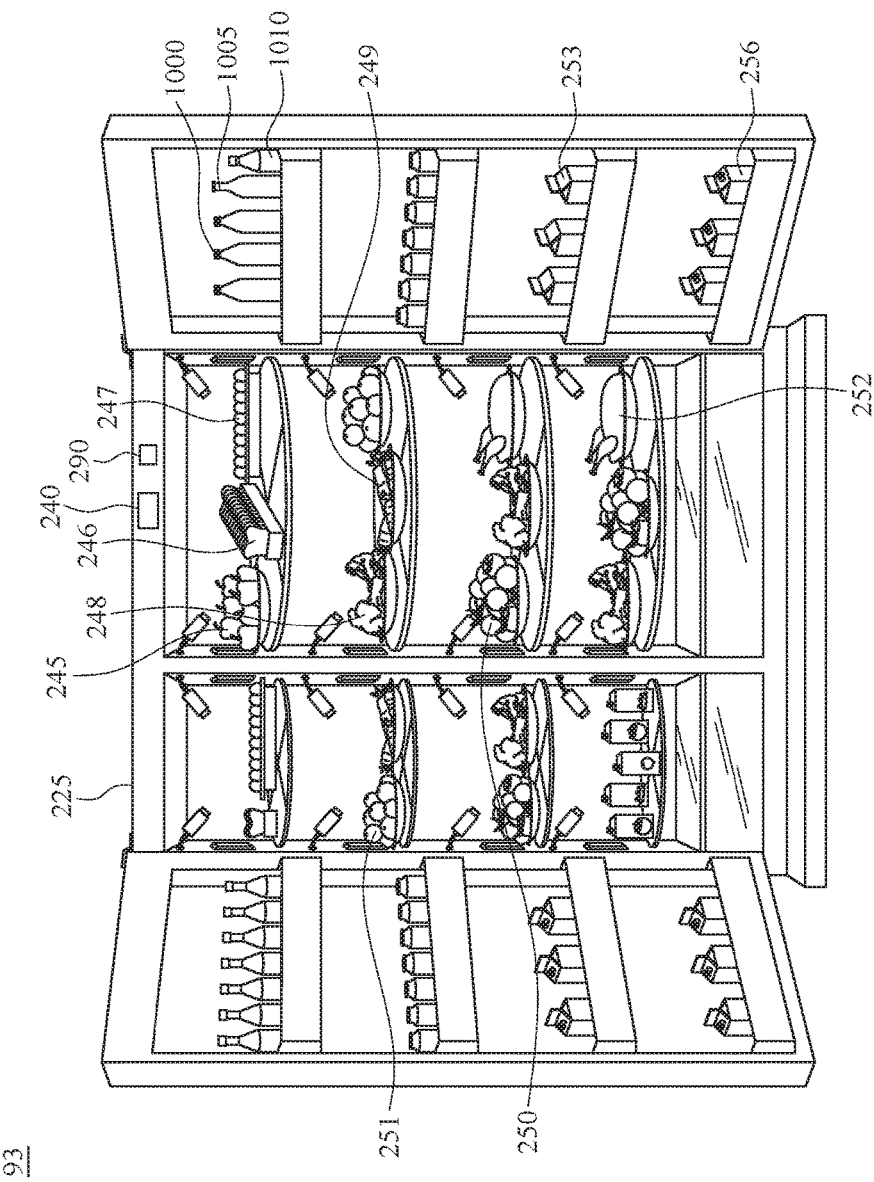
FIG. 11A demonstrates an embodiment 93 of the refrigerator showing food items contained therein, in accordance with the invention as a diagram.

FIG. 11A demonstrates another embodiment 93 of the refrigerator 225 showing food items 259 contained therein, in accordance with the invention as a diagram. The user may store a week's groceries in the refrigerator 225 as depicted in FIG. 11A. The cameras 235, 236, 237, and/or 238 capture images of the food items 259. The GPU 210 or 240 processes and analyses the images to identify each food item 259 present in the refrigerator 225 along with a quality and quantity of the food items 259. The identified food items 259 include, for example, bread 246, eggs 247, tomatoes 250, carrots 249, broccoli 248, oranges 251, juice boxes 256, apple 245, chicken 252, milk cartons 253, beverages 1005, ketchup 1010, water bottles 1000, etc. Further, the GPU 210 or 240 recognizes the quality, quantity, expiry date, calorie information, etc., associated with each food item 259.

Figure 11B:
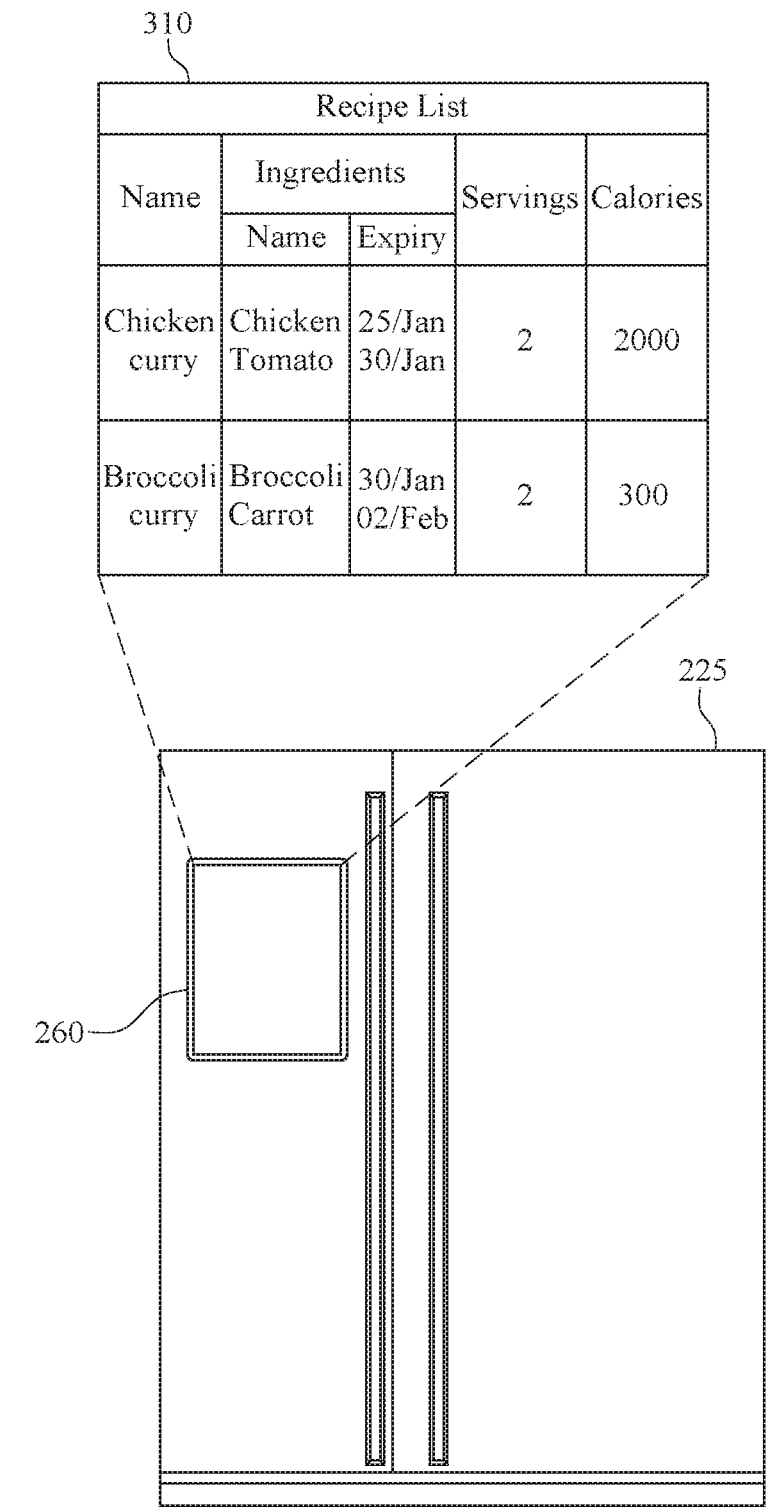
FIG. 11B demonstrates an embodiment 94 of a software program product user interface showing a derived recipe recommendation list based on the food items of the refrigerator, in accordance with the invention as a screen shot diagram.

FIG. 11B demonstrates an embodiment 94 of a software program product user interface 310 showing a derived recipe recommendation list based on the food items 259 of the refrigerator 225, in accordance with the invention as a screen shot diagram. This could be for example a display screen 260 on a front door of the refrigerator 225. In another example not depicted in FIG. 11B, the software program product user interface 310 may be the screen 261 of a tablet or a smartphone. The refrigerator system 200 behind the user interface 310 could be e.g. embodiment 20, 60, and 70 explained with respect to FIG. 2A, FIG. 6, and FIG. 7.

The CPU 290 uses the recognized information associated with the food items 259 to create recipe recommendations for the user. For example, the CPU 290 suggests a recipe for chicken curry that includes chicken and tomatoes as ingredients for the recipe. The CPU 290 takes into consideration an expiry date of each ingredient to ensure that the food items 259 are consumed before their expiration dates. The user interface 310 illustrates a recipe list generated by the CPU 290. The recipe list includes other recipe-related information such as, number of servings per recipe, number of calories associated with each recipe, etc.

Any features of embodiments 93 and/or 94 may be readily combined or permuted with any of the other embodiments 10, 20, 21, 30, 40, 41, 42, 50, 60, 70, 80, 81, 90, 91, and/or 92 in accordance with the invention.

The invention has been explained in the aforementioned and sizable advantages of the invention have been demonstrated. The invention results in ensuring minimal or no food wastage, may provide multiple diet plans or recipes as a function of time, and provides healthier and nutritious diets in comparison to diets that are reachable by consumers with prior art methods. By identifying deficient food items to be replenished and updating a shopping list with the deficient food items, the invention results in accurate and automatic purchasing decisions. The shopping list is directly communicated with a grocer or a food delivery agent 700, preferably electronically, that saves a user money and transit time. The invention leads to optimal food consumption that minimizes food wastage and simplifies management of logistics of grocery shopping and meal preparation. The identification of healthier foods and retrieval of corresponding recipes and diet plans allows the user to save time invested in food preparation and/or procurement. The use of deep learning architectures by the GPU 210 or 240 for identifying the food items present in the refrigerator 225 allows fast processing and analysis of the images that is time efficient.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

US 2016/0327281 A1 CONNECTED FOOD PREPARATION SYSTEM AND METHOD OF USE, published on Nov. 10, 2016 Bhogal et al.
WO 2011/020742 A1, METHOD AND MEANS FOR DATA SEARCHING AND LANGUAGE TRANSLATION, 2011, Mikko Väänänen.
A PRACTICAL INTRODUCTION TO DEEP LEARNING WITH CAFFE AND PYTHON, published on Jun. 26, 2016, Adil Moujahid.

The invention claimed is:
1. A refrigerator system comprising:
transparent internal wall of the refrigerator system for illuminating a food article or food package stored inside the refrigerator system or mounted on a internal wall;
a camera mounted on a internal wall, wherein
the is configured to capture a photograph of the food article or the food package;
a graphical processing unit GPU configured to analyse the photograph for determining food quantity, food quality, or type of food and produce alphanumeric values describing food quantity, food quality, or type of food into computer readable memory.
2. The refrigerator system as claimed in claim 1, wherein information related to any of the food quantity, the food quality, and the type of food is used in controlling or advising on the diet of the human user.
3. The refrigerator system as claimed in claim 1, wherein information related to any of the food quantity, the food quality, and the type of food is used in identifying deficiencies in contents of the refrigerator system, and the identified deficiencies are used in updating a shopping list and sending the shopping list to a grocery shop-or a food delivery agent.
4. The refrigerator system as claimed in claim 1, wherein information related to any of the food quantity, the food quality, and the type of food is used in identifying at least one recipe for a meal that could be implemented with the food.

5. The refrigerator system as claimed in claim 4, wherein the information related to any of the food quantity, the food quality, and the type of food is used in identifying a series of recipes for meals that could be implemented with the food based upon criteria of:
minimisation of waste of the food,
maximisation of diet variety as a function of time, or
maximisation of healthiness of the diet.

6. The refrigerator system as claimed in claim 1, further being configured to conduct a visual search-using the photograph or a portion of the photograph as a query term, or text present in at least one food package is identified from the photograph, and identified text is used as a query term.

7. The refrigerator system as claimed in claim 6, further being configured to identify best before dates on the food packages, and using the best before dates in compiling a list of recipes for meals as a function of time and consuming a maximum amount of the food before expiry of the best before dates on any of the food packages food.

8. The refrigerator system as claimed in claim 1, wherein the system further comprises a scale for weighing the food or a device for moving the food mechanically inside the refrigerator system.

9. The refrigerator system as claimed in claim 1, further being configured to receive images of at least one of meals, food articles, and food packages from the user and the graphical processing unit GPU is configured to utilize information related to at least one of the food quantity, the food quality, and the type of food for determining a changed recipe list, and sending the changed recipe list to a user terminal device.

10. The refrigerator system as claimed in claim 1, further being configured to receive data files from a cloud server, wherein the data files are deep learning data files configured to facilitate recognition of the food articles, by the GPU, using at least one photograph of the food articles, or
the at least one photograph or data derived from the at least one photograph is communicated to a social network account of a user.

11. A method for controlling a refrigerator system, the method comprising:
providing a food article or food package stored inside the refrigerator system;
illuminating the food article or the food package using at least one light mounted on an internal wall of the refrigerator system, or with a transparent internal wall wherein light emerges through the internal wall;
capturing a photograph of the food article or the food package using at least one camera mounted on a internal wall; and
analysing the photograph, using a graphical processing unit GPU,
determining food quantity, food quality, or type of food from the photograph and produce alphanumeric values describing food quantity, food quality, or type of food into computer readable memory.

12. The method as claimed in claim 11, wherein information related to any of the food quantity, the food quality, and the type of food is used in controlling-and advising on the diet of the human user.

13. The method as claimed in claim 11, wherein information related to any of the food quantity, the food quality, and the type of food is used in identifying deficiencies in contents of the refrigerator system, and the identified deficiencies are used in updating a shopping list and sending the shopping list to a grocery shop or food delivery agent.

14. The method as claimed in claim 11, wherein information related to any of the food quantity, the food quality, and the type of food is used in identifying at least one recipe for a meal that could be implemented with the food.

15. The method as claimed in claim 14, wherein the information related to any of the food quantity, the food quality, and the type of food is used in identifying a series of recipes for meals that could be implemented with the food based upon criteria of:
minimisation of waste of the food,
maximisation of diet variety as a function of time, or
maximisation of healthiness of the diet.

16. The method as claimed in claim 11, further comprising performing a visual search using the photograph or a portion of the photograph as a query term, or identifying text present in at least one food package using the photograph and using the identified text as a query term.

17. The method as claimed in claim 16, further comprising identifying best before dates on the food packages, and using the best before dates in compiling a list of recipes for meals as a function of time and the recipe list consuming a maximum amount of the food before expiry of the best before dates on any of the food packages.

18. The method as claimed in claim 11, further comprising utilizing a scale for weighing the food-or a device for moving the food mechanically inside the refrigerator system.

19. The method as claimed in claim 11, further comprising receiving images of at least one of meals, the food articles, and the food packages from the user and utilizing, by the graphical processing unit GPU, information related to at least one of the food quantity, the food quality, and the type of food for determining a changed recipe list, and sending the changed recipe list to a user terminal device.

20. The method as claimed in claim 11, further comprising receiving data files from a cloud server wherein the data files are deep learning data files configured to facilitate recognition of the food articles, by the GPU, using at least one photograph of the food articles, or
communicating the at least one photograph or data derived from the at least one photograph to a social network account of a user.

21. A software program product stored in a memory medium for controlling a refrigerator system, the software program product comprising programmed instructions for:
illuminating food articles or food packages, stored in the refrigerator system, using at least one light mounted on an internal wall of the refrigerator system or a transparent internal wall;
capturing a photograph of the food article or the food package using at least one camera mounted on a internal wall; and
analyzing the photograph, using a graphical processing unit GPU,
for determining food quantity, food quality, or type of food and producing alphanumeric values describing food quantity, food quality, or type of food into computer readable memory.

22. The software program product as claimed in claim 21, wherein information related to any of the food quantity, the food quality, and the type of food is used in controlling or advising on the diet of the human user.

23. The software program product as claimed in claim 21, wherein information related to any of-the food quantity, the food quality, and the type of food is used in identifying deficiencies in contents of the refrigerator system, and the identified deficiencies are used in updating a shopping list and sending the shopping list to a grocery shop or food delivery agent.

24. The software program product as claimed in claim 21, wherein the information related to any of the food quantity, the food quality, and the type of food-is used in identifying at least one recipe for a meal that could be implemented with the food.

25. The software program product as claimed in claim 24, wherein the information related to any of the food quantity, the food quality, and the type of food-is used in identifying a series of recipes for meals that could be implemented with the food based upon criteria of:
- minimisation of waste of the food,
- maximisation of diet variety as a function of time, or
- maximisation of the healthiness of the diet.

26. The software program product as claimed in claim 21, further comprising programmed instructions to perform a visual search using the photograph or a portion of the photograph as a query term, identifying text present in at least one food package using the photograph, and using the identified text as a query term.

27. The software program product as claimed in claim 26, further comprising programmed instructions for identifying best before dates on the food packages, and using the best before dates in compiling a list of recipes for meals as a function of time and consuming a maximum amount of the food before expiry of the best before dates on any of the food packages.

28. The software program product as claimed in claim 21, further comprising programmed instructions for utilizing a scale for weighing the food or a device for moving the food mechanically inside the refrigerator system.

29. The software program product as claimed in claim 21, further comprising programmed instructions for receiving images of at least one of meals, the food articles, and the food packages from the user and utilizing, by the graphical processing unit GPU, information related to at least one of the food quantity, the food quality, and the type of food for determining a changed recipe list, and sending the changed recipe list to a user terminal device.

30. The software program product as claimed in claim 21, further comprising programmed instructions for receiving data files from a cloud server wherein the data files are deep learning data files configured to facilitate recognition of the food articles, by the GPU, using at least one photograph of the food articles, or communicating the at least one photograph or data derived from the at least one photograph to a social network account of a user.

* * * * *

UNITED STATES PATENT AND TRADEMARK OFFICE
CERTIFICATE OF CORRECTION

PATENT NO. : 9,965,798 B1
APPLICATION NO. : 15/453912
DATED : May 8, 2018
INVENTOR(S) : Mikko Vaananen Page 1 of 1

It is certified that error appears in the above-identified patent and that said Letters Patent is hereby corrected as shown below:

In the Claims

In Column 30, Line 49, Claim 1, insert -- "camera", wherein said --, therefor.

In Column 30, Line 65, Claim 3, delete "-", therefor.

In Column 31, Line 63, Claim 12, delete "-", therefor.

In Column 32, Line 27, Claim 18, delete "-", therefor.

In Column 32, Line 66, Claim 23, delete "-", therefor.

In Column 33, Line 7, Claim 24, delete "-", therefor.

In Column 33, Line 12, Claim 25, delete "-", therefor.

Signed and Sealed this
Second Day of October, 2018

Andrei Iancu
*Director of the United States Patent and Trademark Office*